US 6,462,900 B1
Oct. 8, 2002

(12) United States Patent
Egan et al.

(54) CARTRIDGE PICKER ROBOT WITH RIBBON CABLE FOR CARTRIDGE LIBRARY

(75) Inventors: Brian P. Egan, Thornton; Robert E. Schneider, Erie; John F. Ellis, Louisville, all of CO (US)

(73) Assignee: Exabyte Corporation, Boulder, CO (US)

( * ) Notice: Subject to any disclaimer, the term of this patent is extended or adjusted under 35 U.S.C. 154(b) by 22 days.

(21) Appl. No.: 09/708,432

(22) Filed: Nov. 9, 2000

(51) Int. Cl.⁷ .............................................. G11B 15/68
(52) U.S. Cl. ........................................................ 360/92
(58) Field of Search ........................................... 360/92

(56) References Cited

U.S. PATENT DOCUMENTS

| | | | |
|---|---|---|---|
| 3,833,807 A | 9/1974 | Takeda | |
| 4,754,397 A | 6/1988 | Varaiya et al. | |
| 4,869,591 A | 9/1989 | MacGregor | |
| 4,908,715 A | 3/1990 | Krum et al. | |
| 4,918,548 A | 4/1990 | O'Donnell et al. | |
| 4,972,277 A | 11/1990 | Sills et al. | |
| 4,984,106 A | 1/1991 | Herger et al. | |
| 5,021,902 A | 6/1991 | Ishikawa et al. | |
| 5,059,772 A | 10/1991 | Younglove et al. | |
| 5,103,986 A | 4/1992 | Marlowe | |
| 5,184,260 A | 2/1993 | Pierrat | |
| 5,237,467 A | 8/1993 | Marlowe | |
| 5,373,489 A | 12/1994 | Sato et al. | |
| 5,402,283 A | 3/1995 | Yamakawa et al. | |
| 5,414,519 A | 5/1995 | Han | |
| 5,416,653 A | 5/1995 | Marlowe | |
| 5,469,310 A | 11/1995 | Slocum et al. | |
| 5,487,579 A | 1/1996 | Woodruff et al. | |
| 5,498,116 A | 3/1996 | Woodruff et al. | |
| 5,502,697 A | 3/1996 | Taki | |
| 5,512,761 A | 4/1996 | Winkelmann | |
| 5,555,143 A | 9/1996 | Hinnen et al. | |
| 5,607,275 A | * 3/1997 | Woodruff et al. | 360/92 |
| 5,659,440 A | 8/1997 | Acosta et al. | |
| 5,661,287 A | 8/1997 | Schaefer et al. | |
| 5,718,339 A | 2/1998 | Woodruff et al. | |
| 5,739,978 A | 4/1998 | Ellis et al. | |
| 5,892,750 A | * 4/1999 | Barkley et al. | 360/92 |
| 6,005,745 A | 12/1999 | Filkins et al. | |
| 6,008,964 A | 12/1999 | Goodknight et al. | |
| 6,144,521 A | 11/2000 | Egan et al. | |
| 6,175,462 B1 | 1/2001 | Schneider et al. | |

OTHER PUBLICATIONS

U.S. patent application SN 08/970,205, filed Nov. 14, 1997, entitled "Cartridge Library With Cartridge Loader Mounted on Moveable Drive Assembly".

(List continued on next page.)

Primary Examiner—Robert S. Tupper
(74) Attorney, Agent, or Firm—Nixon & Vanderhye, P.C.

(57) ABSTRACT

A robotic cartridge picker (92) for a cartridge library (20) has picker fingers (84) for selecting engaging and disengaging a media cartridge (64), and an electronic device (180) carried thereon. A ribbon cable (182) supplies at least one of power and an electrical signal to the electronic device. The robotic picker is rotatably mounted on a mounting block (140). The mounting block has a chamber (188) wherein a portion of the ribbon cable is carried in a variable coiled configuration to accommodate rotation of the robot about an axis (100). The variable coiled configuration facilitates the ribbon cable having a first degree of coiling when the picker robot rotates to a first position and a second degree of coiling when the picker robot rotates to a second position.

36 Claims, 28 Drawing Sheets

OTHER PUBLICATIONS

U.S. patent application SN 09/121,541, filed Jul. 24, 1998, entitled "Cartridge Library and Method of Operation".
U.S. patent application SN 09/121,819, filed Jul. 24, 1998, entitled "Cartridge Library and Method of Operation".
U.S. patent application SN 09/121,817, filed Jul. 24, 1998, entitled "Drive Carrier and Cartridge Library Employing Same".
U.S. patent application Ser. No. 09/708,433, filed Nov. 9, 2000, entitled "Cartridge Library".
U.S. patent application Ser. No. 09/708,739, filed Nov. 9, 2000, entitled "Cartridge Overinsertion Protection for Cartridge Library".
U.S. Design patent application Ser. No. 29/132,408, filed Nov. 9, 2000, entitled "Cartridge Library".
U.S. Design patent application Ser. No. 29/132,407, filed Nov. 9, 2000, entitled "Magazine for Data Cartridges".
U.S. patent application Ser. No. 09/708,451, filed Nov. 9, 2000, entitled "Adjustable Mounting for Barcode Reader With Backlash Prevention".

* cited by examiner

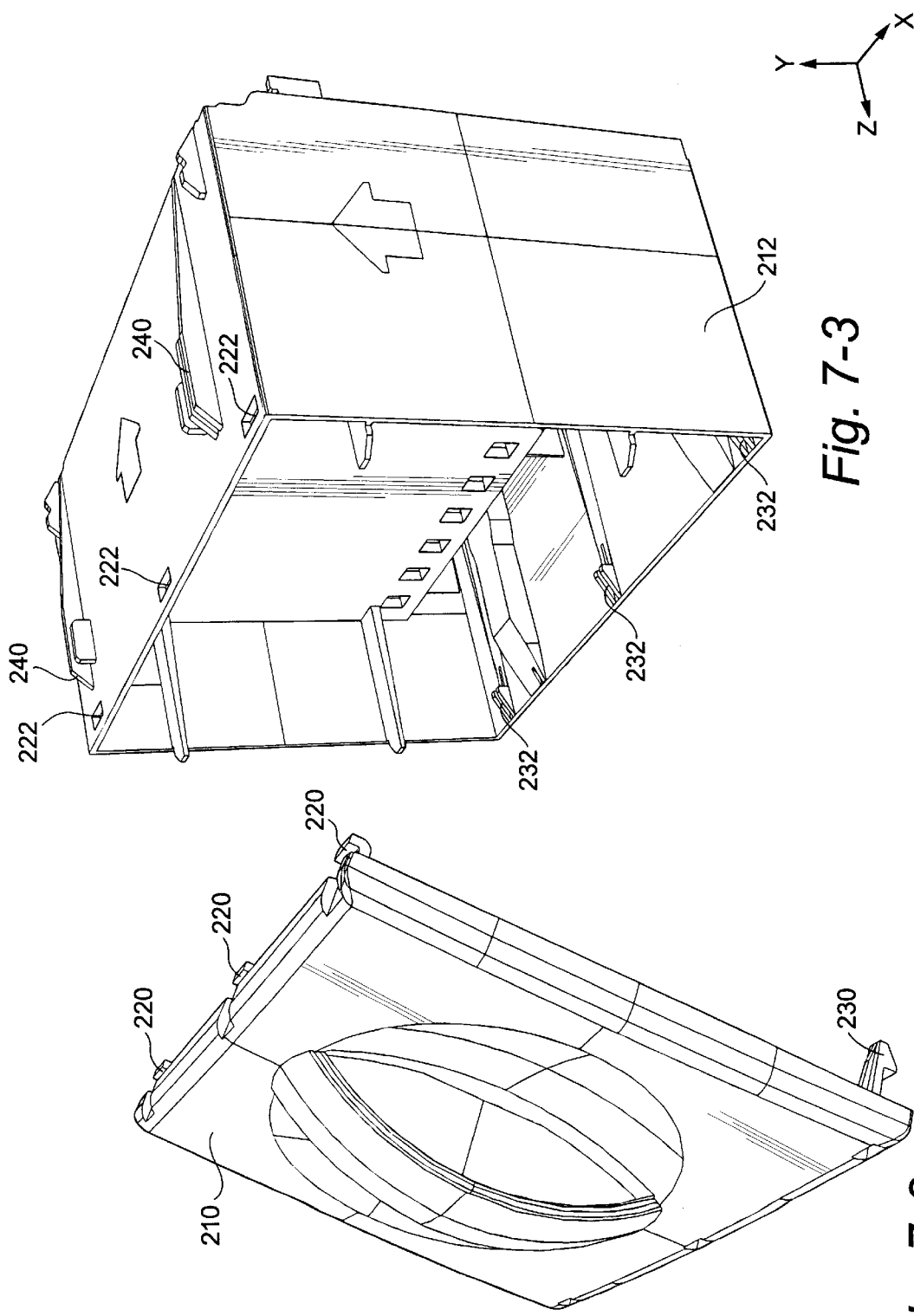

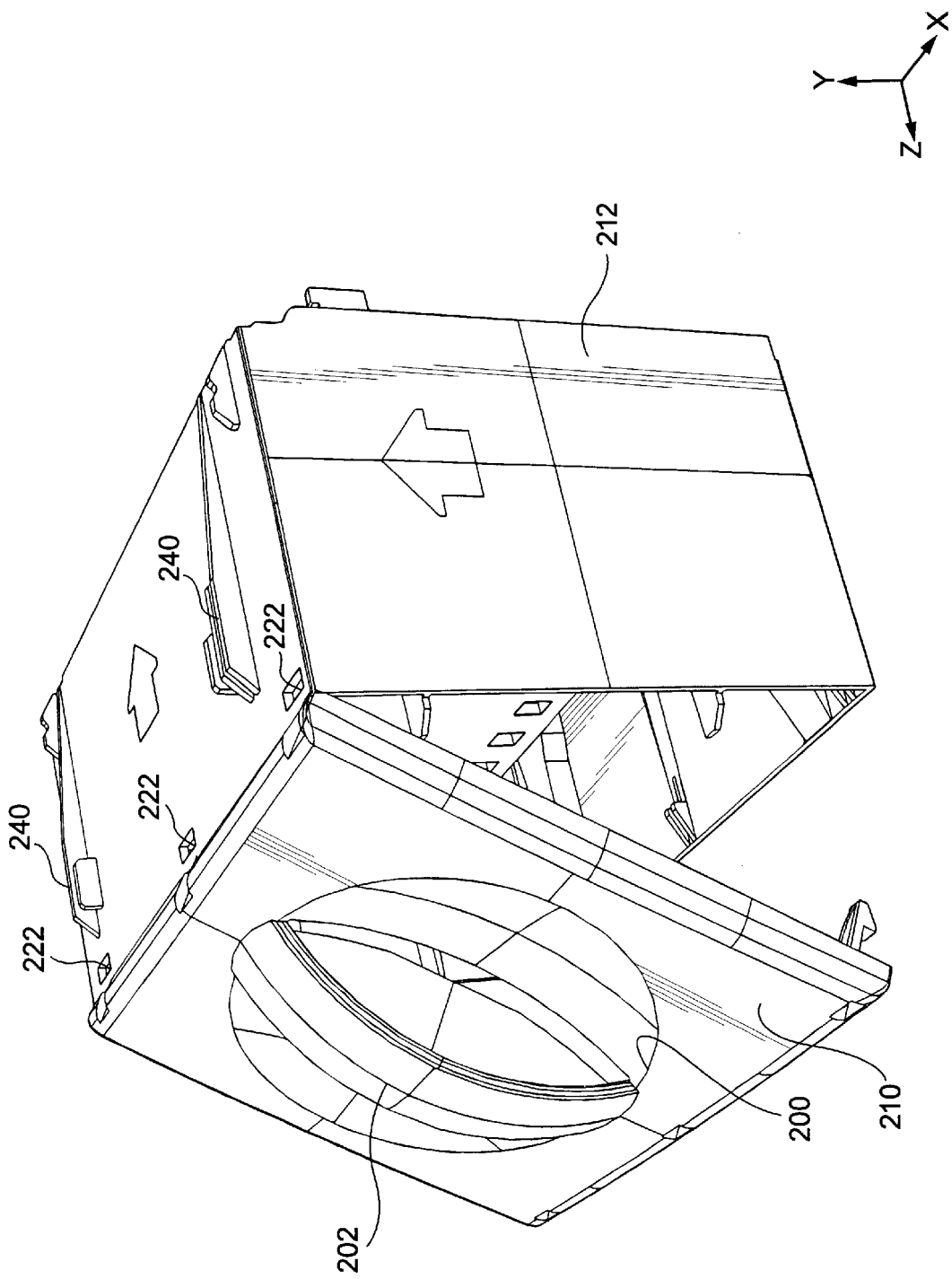

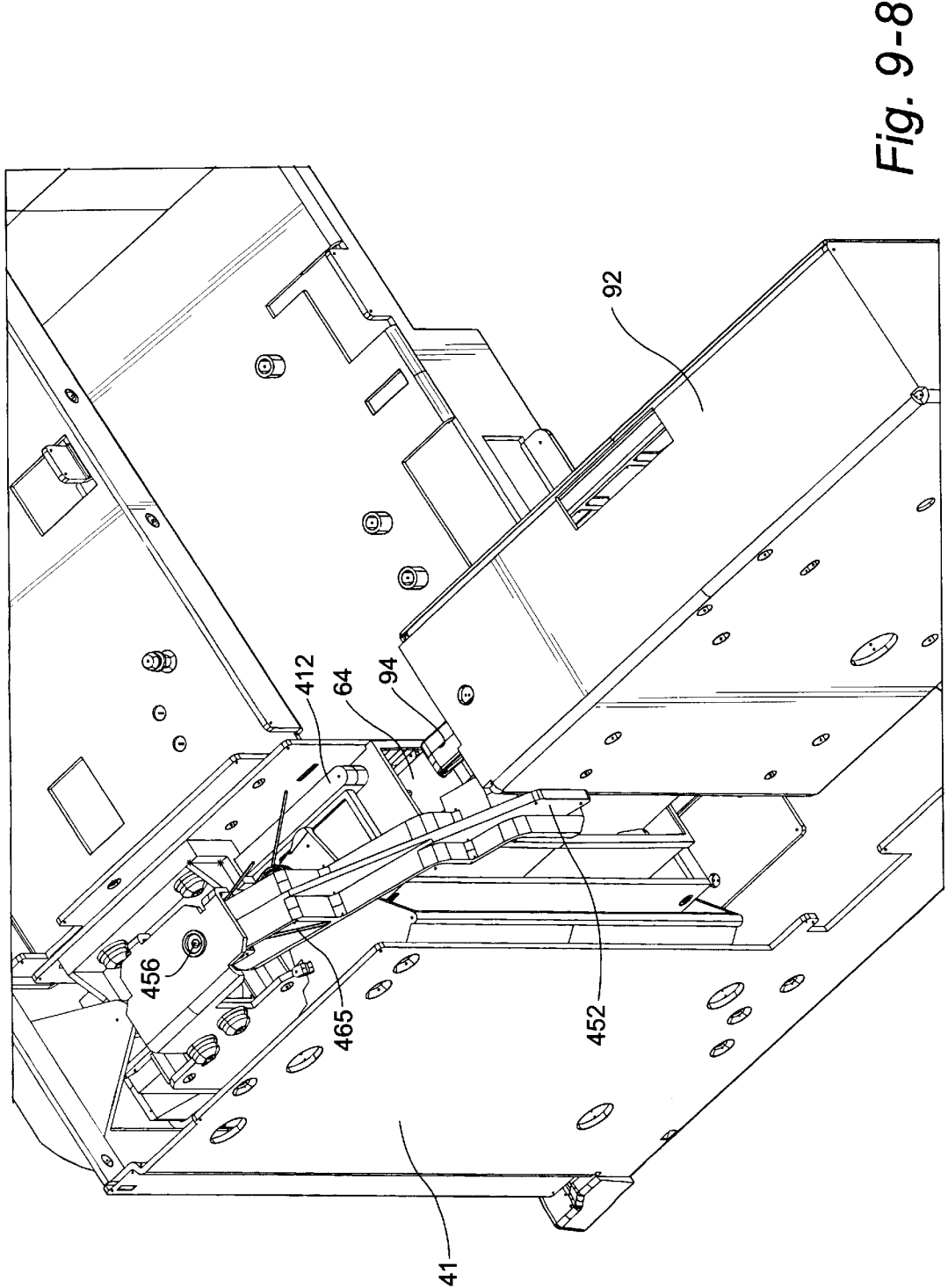

CARTRIDGE PICKER ROBOT WITH RIBBON CABLE FOR CARTRIDGE LIBRARY

This application is related to the following simultaneously-filed U.S. Patent Applications (all of which are incorporated herein by reference in their entirety):

U.S. patent application Ser. No. 09/708,433, entitled "CARTRIDGE LIBRARY";

U.S. patent application Ser. No. 09/708,739, entitled "CARTRIDGE OVERINSERTION PROTECTION FOR CARTRIDGE LIBRARY";

U.S. patent application Ser. No. 09/708,739, entitled "ADJUSTABLE MOUNTING FOR BARCODE READER WITH BACKLASH PREVENTION";

U.S. Design patent application Ser. No. 29/132,408, entitled "CARTRIDGE LIBRARIES";

U.S. Design patent application Ser. No. 29/132,407, entitled "CARTRIDGE MAGAZINE".

BACKGROUND

1. Field of the Invention

The present invention pertains to the storage of information, and particularly to automated cartridge handling systems such as cartridge libraries which store cartridges or cassettes of magnetic tape.

2. Related Art and Other Considerations

In the early days of computers, information requiring storage could be transmitted from a computer to a tape drive, whereat the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. While many persons are familiar with tape cartridges of a type which can be loaded into a "tape deck" for reproduction of audio information (e.g., music), it is not as commonly realized that similar cartridges, although of differing sizes, can be used to store such information as computer data. For years now magnetic tape cartridges have proven to be an efficient and effective medium for data storage, including but not limited to computer back-up.

Large computer systems have need to access numerous cartridges. To this end, automated cartridge handling systems or libraries for cartridges have been proposed for making the cartridges automatically available to the computer. Many of these automated libraries resemble juke boxes. Typically, prior art automated cartridge libraries have an array of storage positions for cartridges, one or more tape drives, and some type of automated changer or cartridge engagement/transport mechanism for picking or gripping a cartridge and moving the cartridge between a storage position and the tape drive.

Important to the automation of cartridge libraries as previously known has been the provision of the cartridge changer or cartridge engagement/transport mechanism for picking or gripping a cartridge and moving the cartridge between a storage position and the tape drive. Such rotobic mechanisms, often called a cartridge "picker" or "gripper", is typically mounted in a library frame in order to introduce and remove cartridges relative to one or more stationary drives. The stationary drive and the picker are mounted to the same basic frame structure of the library, but otherwise are structurally independent.

The following U.S. patents and patent applications, all commonly assigned herewith and incorporated herein by reference, disclose various configurations of automated cartridge libraries, as well as subcomponents thereof (including cartridge engagement/transport mechanisms, entry/exit ports, and storage racks for housing cartridges):

U.S Pat. No. 4,984,106 to Herger et al., entitled "CARTRIDGE LIBRARY SYSTEM AND METHOD OF OPERATION THEREOF".

U.S. Pat. No. 4,972,277 to Sills et al., entitled "CARTRIDGE TRANSPORT ASSEMBLY AND METHOD OF OPERATION THEREOF".

U.S. Pat. No. 5,059,772 to Younglove, entitled "READING METHOD AND APPARATUS FOR CARTRIDGE LIBRARY".

U.S. Pat. No. 5,103,986 to Marlowe, entitled "CARTRIDGE RACK".

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled PICKER MECHANISM FOR DATA CARTRIDGES".

U.S. Pat. No. 5,718,339 to Woodruff et al., entitled "CARTRIDGE RACK AND LIBRARY FOR ENGAGING SAME".

U.S. Pat. No. 5,739,978, entitled "CARTRIDGE HANDLING SYSTEM WITH MOVING I/O DRIVE".

U.S. Pat. No. 6,008,964, entitled "CARTRIDGE LIBRARY AND METHOD OF OPERATION THEREOF".

U.S. patent application Ser. No. 08/970,205, entitled "CARTRIDGE LIBRARY WITH CARTRIDGE LOADER MOUNTED ON MOVEABLE DRIVE ASSEMBLY".

U.S. patent application Ser. No. 09/121,541, entitled "CARTRIDGE LIBRARY AND METHOD OF OPERATION".

U.S. Pat. No. 6,005,745 application Ser. No. 09/121,816, entitled "CARTRIDGE LIBRARY WITH ENTRY/EXIT PORT AND METHOD OF OPERATION THEREOF".

U.S. patent application Ser. No. 09/121,819, entitled "CARTRIDGE LIBRARY AND METHOD OF OPERATION".

U.S. patent application Ser. No. 09/121,966, entitled "CARTRIDGE MAGAZINE AND LIBRARY EMPLOYING SAME".

U.S. patent application Ser. No. 09/121,817, entitled "DRIVE CARRIER AND CARTRIDGE LIBRARY EMPLOYING SAME".

Often in a cartridge library a picker (e.g., cartridge transport unit) rotates in order to transport a cartridge or cassette of media between a drive and a cartridge storage location (e.g., a cartridge magazine). Since the picker may have electronics mounted thereon, such as a barcode reader (for example), cables to the electronics must not be adversely impacted by the rotation, nor should the cables obstruct or otherwise interfere with rotation and operation of the picker.

What is need therefore, and an object of the present invention, is method and apparatus for handling cabling to electrical devices on a picker in a manner compatible with operation of a cartridge library.

BRIEF SUMMARY OF THE INVENTION

A robotic cartridge picker for a cartridge library has picker fingers for selecting engaging and disengaging a media cartridge, and an electronic device carried thereon. A ribbon cable supplies at least one of power and an electrical signal to the electronic device. The robotic picker is rotatably mounted on a mounting block. The mounting block has a chamber wherein a portion of the ribbon cable is carried in a variable coiled configuration to accommodate rotation of the robot about an axis. The variable coiled configuration facilitates the ribbon cable having a first degree of coiling when the picker robot rotates to a first position and a second degree of coiling when the picker robot rotates to a second position.

In an illustrated example embodiment, the mounting block is a carriage which linearly translates with the picker robot. The chamber is cylindrical and concentric with an axis of rotation of the picker robot. The chamber has a circumferential aperture through which the ribbon cable enters the chamber. The aperture is elongated in a direction parallel to the axis of rotation of the picker robot. The mounting block has a bulbous protrusion proximate the aperture. A secures a portion of the ribbon cable to the mounting block at the bulbous protrusion. The ribbon cable exits the chamber in a direction parallel to the axis of rotation of the picker robot. Moreover, in the illustrated example embodiment, the mounting block includes a gear for translating rotation of a shaft extending through the mounting block into rotational motion of the picker robot.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5-1 is a left side perspective view of a cartridge transport assembly and mounting block included in the cartridge library of FIG. 2.

FIG. 5-2 is a top right side perspective view including the mounting block of FIG. 5-1, without a ribbon cable.

FIG. 5-3 is a top right side perspective view including the mounting block of FIG. 5-1, with a ribbon cable.

FIG. 5-4 is a detailed perspective view showing folding of a ribbon cable for exiting from the mounting block of FIG. 5-1.

FIG. 5-5 is a top view showing a first degree of coiling of a ribbon cable within the mounting block of FIG. 5-1 when a cartridge transport assembly is in a first position.

FIG. 5-6 is a top view showing a second degree of coiling of a ribbon cable within the mounting block of FIG. 5-1 when a cartridge transport assembly is in a second position.

FIG. 6 is a front view of a frame front wall of the cartridge library of FIG. 1, with door open.

FIG. 7-1 is a front perspective view of a cartridge magazine according to an example embodiment of the invention.

FIG. 7-2 is a perspective view of a magazine lid for the cartridge magazine of FIG. 7-1.

FIG. 7-3 is a perspective view of a magazine body for the cartridge magazine of FIG. 7-1.

FIG. 7-4 is rear, bottom perspective view of the cartridge magazine of FIG. 7-1.

FIG. 7-5 is a side perspective view showing a hinged opening of a magazine lid relative to a magazine body for the cartridge magazine of FIG. 7-1.

FIG. 8-1 through FIG. 8-3 are left side views of a library front section with library cover removed, for illustrating successive stages of operation of a cartridge restraint assembly according to an embodiment of one aspect of the present invention.

FIG. 9-1 is a front, left side perspective view of a entry/exit port module in accordance with an example embodiment of the invention for use in the cartridge library of FIG. 1.

FIG. 9-2 is a front, left side perspective view of the entry/exit port module of FIG. 9-1, but showing a entry/exit port cover open.

FIG. 9-3 is a rear, left side perspective view of the entry/exit port module of FIG. 9-1.

FIG. 9-4 is a right side, perspective view of the entry/exit port module of FIG. 9-1, showing insertion of a entry/exit port caddy into a entry/exit port housing.

FIG. 9-5 is a front perspective view of the entry/exit port module of FIG. 9-1, also showing insertion of the entry/exit port caddy into the entry/exit port housing.

FIG. 9-6 is a top view showing the entry/exit port module of FIG. 9-1, and particularly showing a cartridge limit finger in its cartridge restraint position.

FIG. 9-7 is a top view showing the entry/exit port module of FIG. 9-1, and particularly showing a cartridge limit finger moved by a cartridge transport assembly to a clearance position.

FIG. 9-8 is a rear perspective view showing the entry/exit port module of FIG. 9-1, and also showing the cartridge limit finger moved by a cartridge transport assembly to a clearance position.

FIG. 10-1 is a top cross sectioned view of a cartridge transport assembly in accordance with an example embodiment of the invention, particularly showing location of a barcode reader assembly.

FIG. 10-2 is a perspective view of the barcode reader assembly included in the cartridge transport assembly of FIG. 10-1.

FIG. 10-3 is a side sectioned view of the barcode reader assembly.

FIG. 10-4 is an exploded view of the barcode reader assembly.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
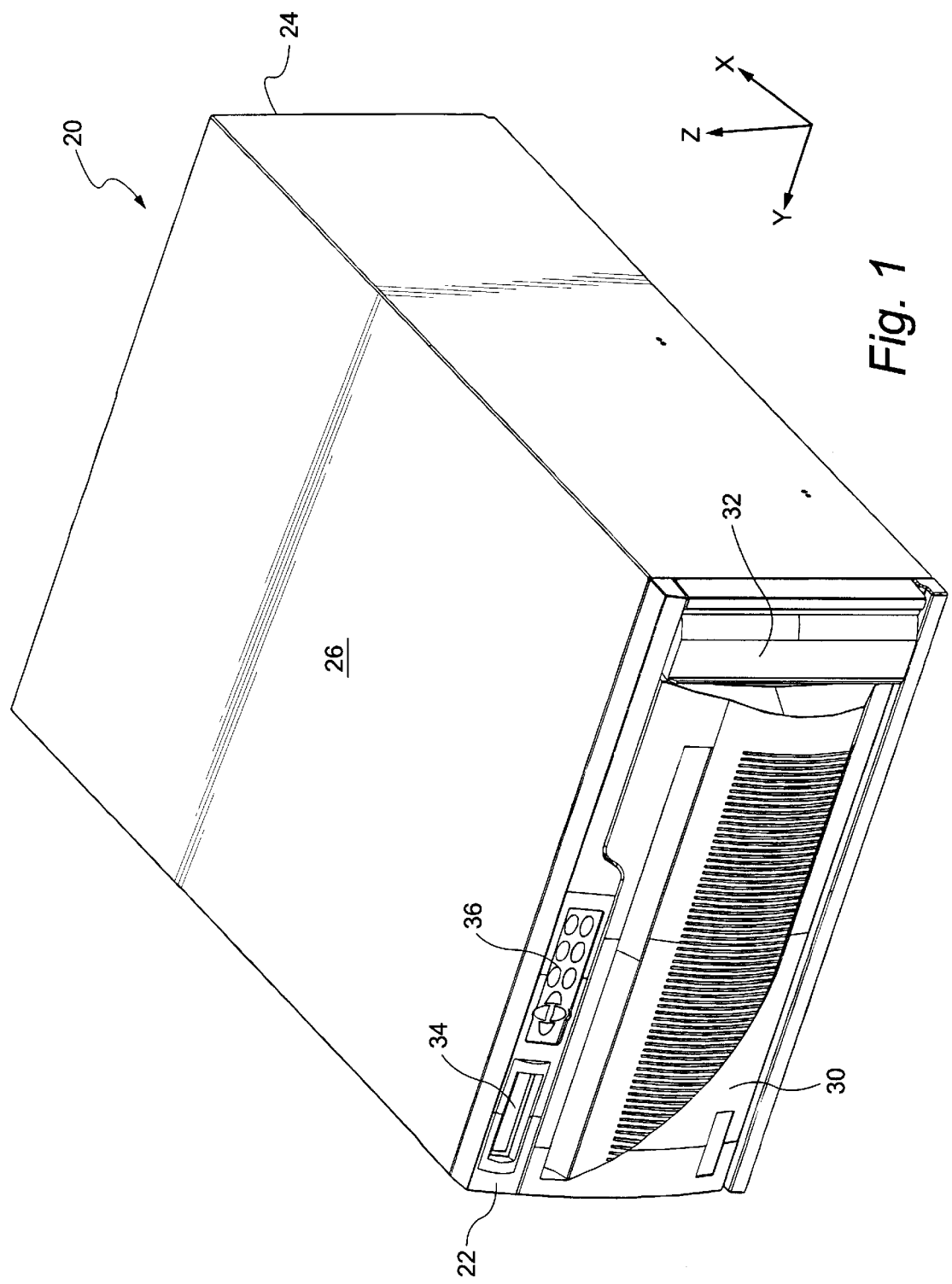
FIG. 1 is a front isometric view of a cartridge library according to an embodiment of the invention, with a library door closed.

FIG. 1 shows an exterior of a cartridge library 20. The cartridge library 20 has a generally solid rectangular shape imparted by a frame which includes a frame front wall 22 and a frame back wall 24. The cartridge library 20 has its sides and top enclosed by a library cover 26. The frame front wall 22 has a door 30 hinged thereto along the frame bottom, and an entry/exit port cover 32 located on its right side. In addition, frame front wall 22 at its top has a display screen 34 and a control button console 36. Views of other sides of cartridge library 20 can be seen in U.S. Design patent application Ser. No. 29/132,408, entitled "CARTRIDGE LIBRARIES", which is incorporated herein by reference.

Figure 2:
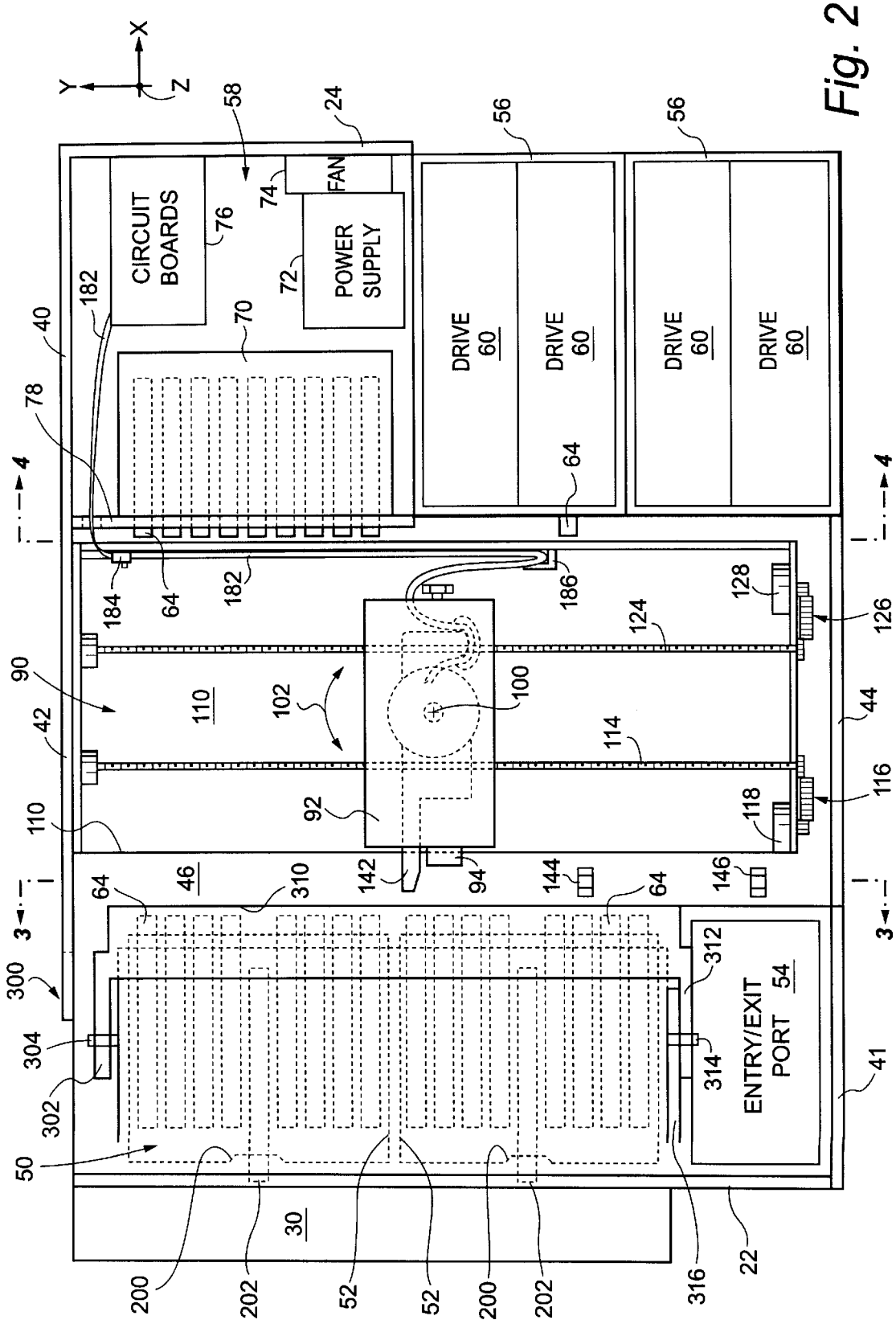
FIG. 2 is a top view of the cartridge library of FIG. 1 with cover removed and door open.

In FIG. 2 the cartridge library 20 is seen from above with its library cover 26 removed and its door 30 open. Various aspects of the library frame are visible in FIG. 2, including the previously mentioned frame front wall 22 and frame back wall 24, as well as frame left side wall 40, frame right side wall 41, frame left side rail 42, frame right side rail 44, and library floor 46. The cartridge library 20 has a width dimension taken along the Y axis of FIG. 2, a depth dimension taken along the X axis of FIG. 2, and a height taken along the Z axis of FIG. 2 (e.g., perpendicular to the plane of the sheet of FIG. 2).

Within the rectangular enclosure defined by the library frame are several compartments or modules which are also visible, at least in part, in FIG. 2. These compartments or modules include a magazine cavity 50 (which accommodates cartridge magazines 52); entry/exit port module 54; a drive region which includes drive carrier modules 56; and, control compartment 58. In the illustrated embodiment, the magazine cavity 50 accommodates two cartridge magazines 52, and two drive carrier modules 56 are provided in the drive region. Each of the drive carrier modules 56 can contain none, one, or two drives 60, the particular library shown in FIG. 2 being filled to capacity with four such drives 60. The drives 60 perform recording and reproducing operations with respect to media in a media cartridge 64 loaded into the drive. The drives 60 are preferably magnetic tape drives, one representative example being the Mammoth family of magnetic tape drives marketed by Exabyte Corporation. Greater or lesser numbers of cartridge magazines 52 and drive carrier modules 56 (and thus drives 60) can be utilized in other embodiments of libraries, e.g., libraries built to different scales.

The cartridge magazines 52 define cells, each cell potentially having a media cartridge 64 stored therein. For simplification, FIG. 2 illustrates each of the cartridge magazines 52 as having only two media cartridges 64 stored therein, although in the illustrated embodiment each of the cartridge magazines 52 has cells for as many as ten different media cartridges 64. Neither the number nor nature of the media cartridges 64 is critical to the present invention. The number of cells formed in the cartridge magazines 52 can vary. Moreover, the cartridge library 20 is built so the choice of drives 60 included in the drive carrier modules 56 is appropriate for the media cartridge type (e.g., appropriate for the media size and media format of the media contained in the cartridge). As used herein, the term "cartridge" has an interchangeable meaning with cassette, and other units of media storage.

The control compartment 58 generally includes an auxiliary cartridge magazine 70; a power supply 72; a fan 74; and several circuit boards (represented by circuit board 76). The auxiliary cartridge magazine 70 is secured to a vertical wall 78 of the library frame in a manner whereby a reference edge of media cartridges 64 contained therein are in the same plane with a media cartridge 64 discharged from any of the drives 60, one such discharged media cartridge 64 being shown in FIG. 2.

Transport Actuator and Guide Region

Also within the library frame is a transport actuator and guide region 90 which extends essentially across the entire width of cartridge library 20. As described subsequently in more detail, the transport actuator and guide region 90 includes a cartridge transport assembly 92 (also known by several other names such as the transport device, the picker robot, or simply as the picker). The cartridge transport assembly 92 transports media cartridges between several locations within cartridge library 20 (e.g., compartments or modules), such as the cartridge magazines 52, the entry/exit port module 54, the drive carrier modules 56, and the auxiliary cartridge magazine 70. To this end, the cartridge transport assembly 92 has a pair of picker fingers 94 for selectively engaging and disengaging a media cartridge. The picker fingers 94 particularly engage respective changer notches 96 provided in the media cartridge 64 (see, e.g., FIG. 9-3). Moreover, the cartridge transport assembly 92 rotates about an axis 100 (i.e., the axis of rotation of cartridge transport assembly 92), as indicated by arrow 102 in FIG. 2. The axis 100 of rotation of cartridge transport assembly 92 is parallel to the Z axis of FIG. 2 (i.e., out of the plane of the sheet of FIG. 2).

The transport actuator and guide region 90 thus serves to divide the cartridge library 20 into a library front section and a library rear section. The entry/exit port module 54 and the magazine cavity 50 (typically with the cartridge magazines 52 inserted therein) are in the library front section, e.g., between transport actuator and guide region 90 and the frame front wall 22. The drive carrier modules 56 and the control compartment 58, including the auxiliary cartridge magazine 70, are in the library rear section, e.g., between transport actuator and guide region 90 and frame back wall 24.

Figure 3:
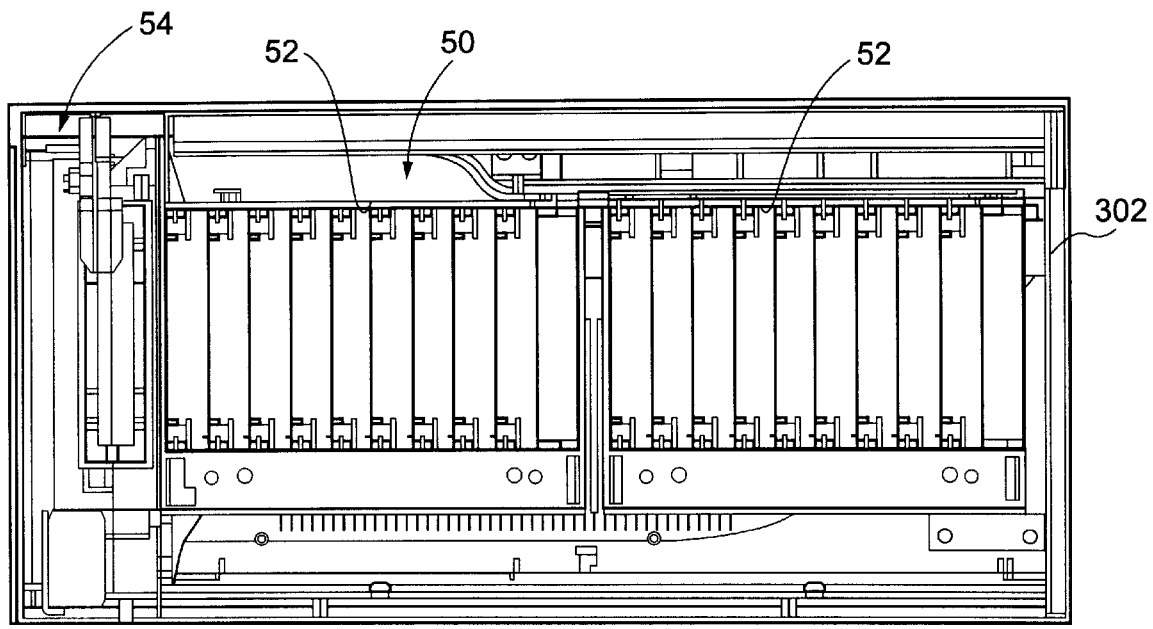
FIG. 3 is a sectional view taken along line 3—3 of FIG. 2, particularly showing a front section of the cartridge library of FIG. 2.
Figure 4:
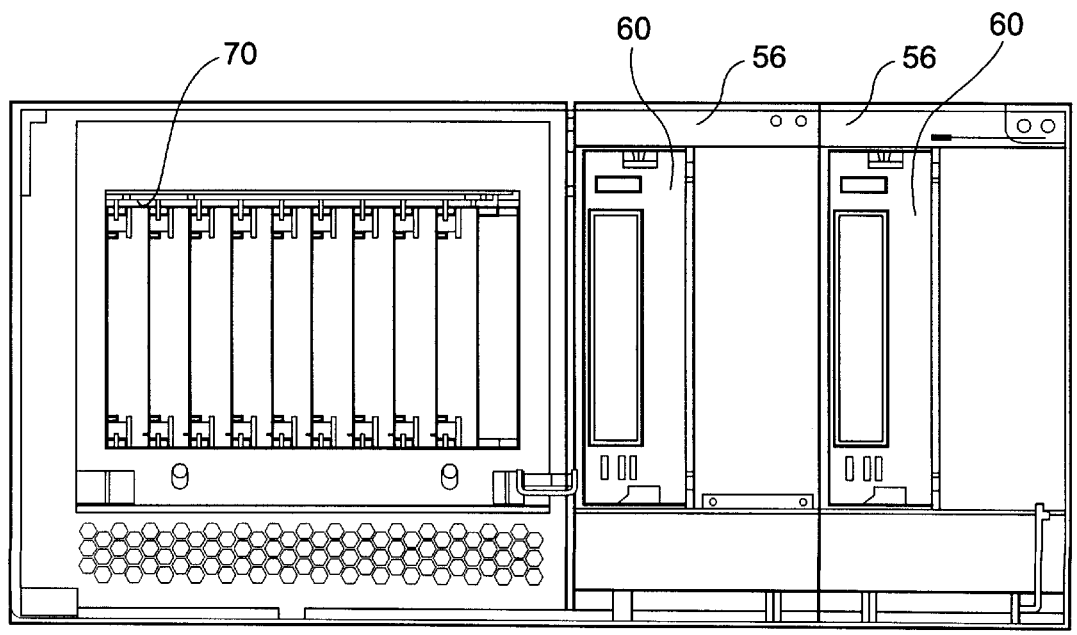
FIG. 4 is a sectional view taken along line 4—4 of FIG. 2, particularly showing a rear section of the cartridge library of FIG. 2.

FIG. 2 shows the cartridge transport assembly 92 rotated to a first transport position. In the first transport position the picker fingers 94 are oriented toward the frame front wall 22. Thus, in the first transport position a barcode reader 502 mounted in the cartridge transport assembly 92 sees the library front section as depicted in FIG. 3, including cartridge magazines 52 and entry/exit port module 54. In the second transport position, on the other hand, the barcode reader 502 in the cartridge transport assembly 92 sees the library rear section as depicted in FIG. 4, including the drive carrier modules 56 and auxiliary cartridge magazine 70.

The transport actuator and guide region 90 is substantially located in or above a horizontal tray 110. The tray 110 is mounted above library floor 46. The tray 110 has vertically upturned side and rear edges. The cartridge transport assembly 92 reciprocates across the width of cartridge library 20 in the transport actuator and guide region 90, e.g., in the Y direction in FIG. 2. The reciprocation occurs along a guideway for the cartridge transport assembly 92, with the guideway taking the form of helically threaded shaft 114. The threaded shaft 114 extends across the width of tray 110 and has its opposing ends received in bearings situated in the opposing upturned side edges of tray 110. Thus, threaded shaft 114 extends in a direction parallel to the frame front wall 22 and the frame back wall 24. The right end of threaded shaft 114 has a gear mounted thereon, the gear being part of a gearing assembly 116 through which motor 118 ultimately rotates threaded shaft 114.

Similarly, the rotation of cartridge transport assembly 92 between its first transport position and its second transport position is effected by an actuator in the form of a shaft 124 of polygon cross section. In the illustrated example, shaft 124 is a hexagonal shaft (e.g., a shaft having a hexagonal cross section). The hexagonal shaft 124 extends across the width of tray 110 and has its opposing ends received in bearings situated in the opposing upturned side edges of tray 110. The right end of hexagonal shaft 124 has a gear mounted thereon, the gear being part of a gearing assembly 126 through which motor 128 ultimately rotates hexagonal shaft 124. Both motor 118 and gearing assembly 128 are mounted within tray 110 on the upturned right edges thereof, and are connected by unillustrated cables to the circuit board 76.

Figures 1, 5:
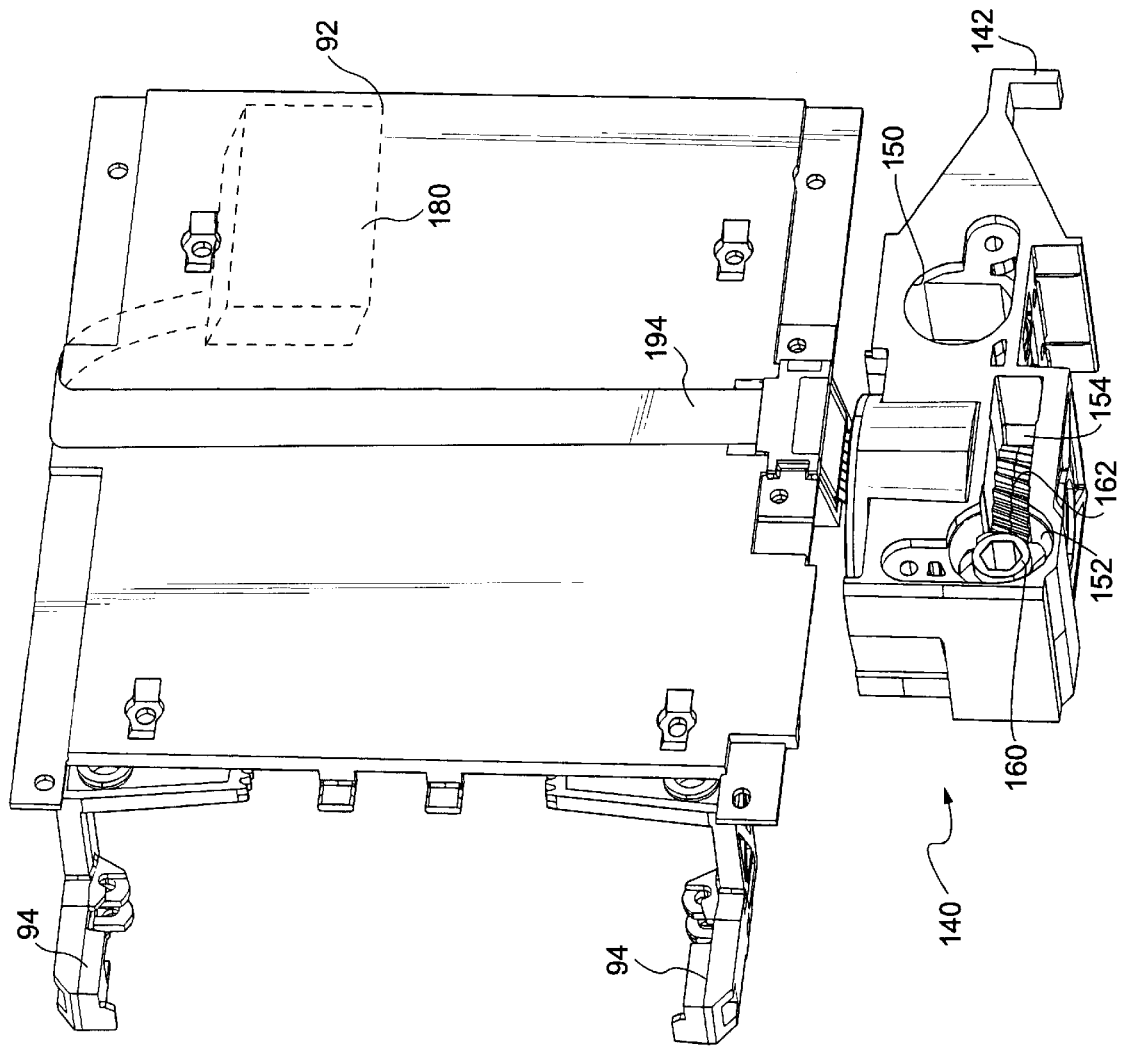
Figures 2, 5:
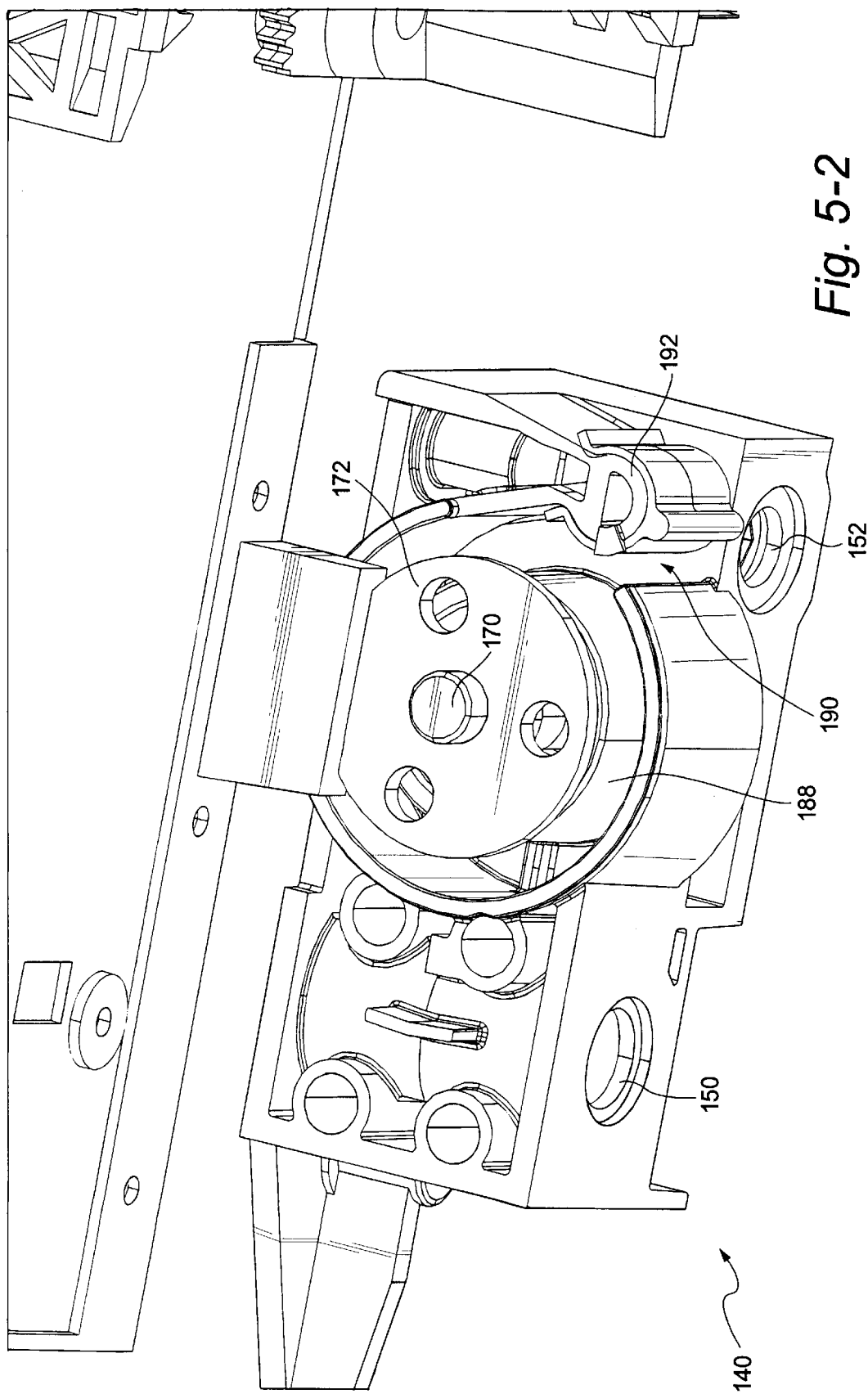
Figures 4, 5:
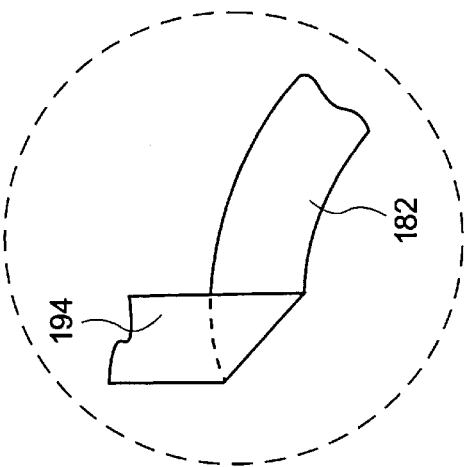
Figures 3, 5:
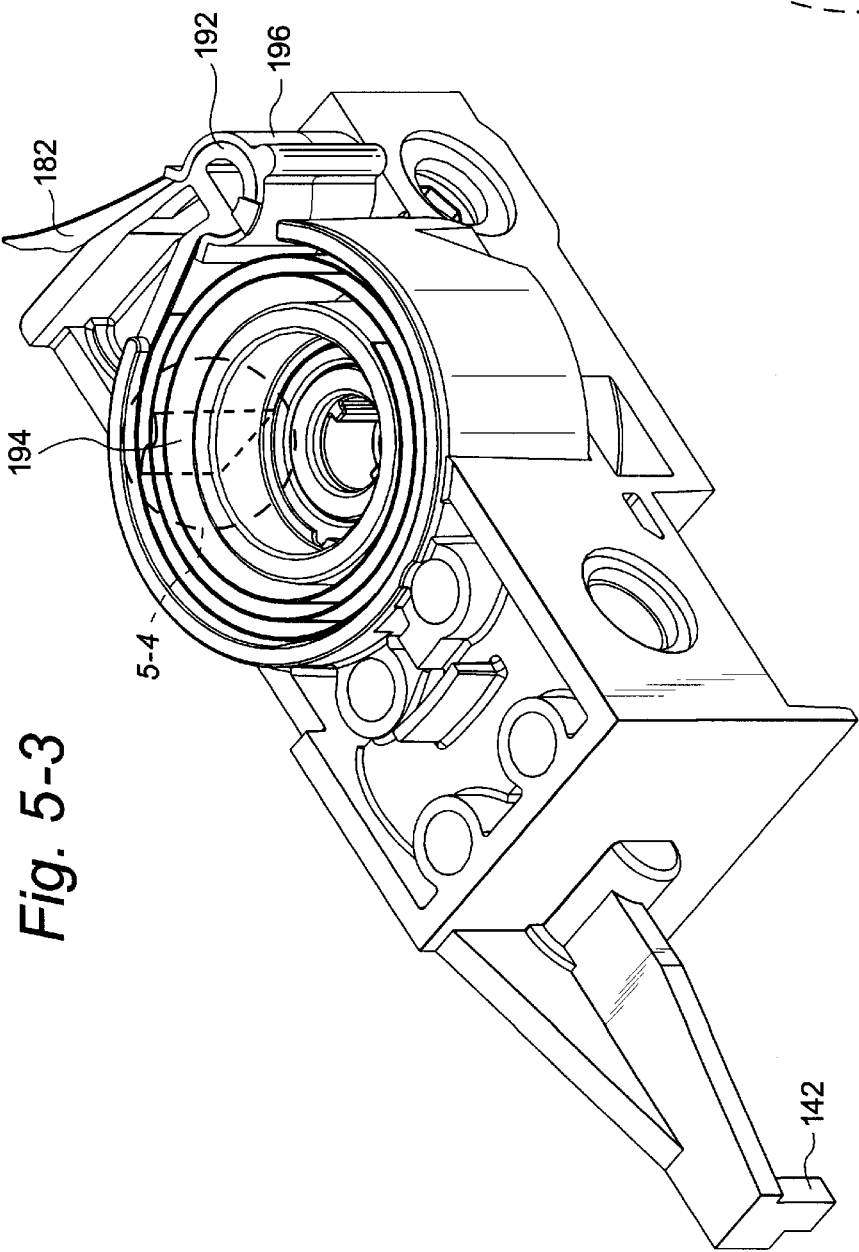
Figure 5:
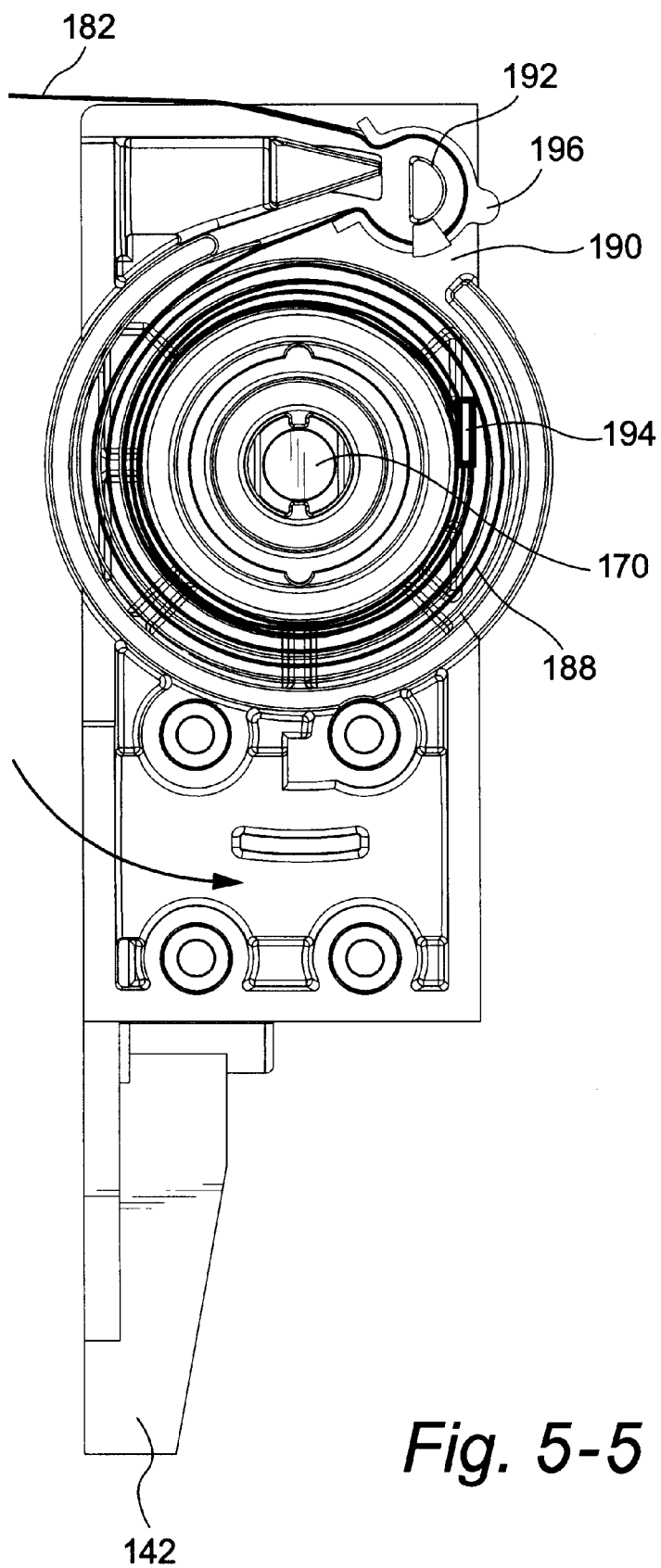

FIG. 5-1 shows cartridge transport assembly 92 in its second position (e.g., with its picker fingers 94 oriented toward the library rear section of cartridge library 20). In addition, FIG. 5-1 shows a carriage or mounting block 140 upon which cartridge transport assembly 92 is rotatably mounted. On its front end, the mounting block 140 has a sensor trip finger 142 depending therefrom which serves to interrupt sensors such as position sensors 144 and 146 mounted on library floor 46 (see FIG. 2).

The mounting block 140 has bores 150 and 152 formed therein along the Y axis, and a gearing cavity 154 formed in communication with bore 150. Retained in bore 150 by an unillustrated retention member is a hollow cylindrical gear 160. The hollow cylindrical gear 160 has an internal aperture shaped and sized so that hexagonal shaft 124 snuggly extends therethrough. An external circumference of cylindrical gear 160 is threaded to engage ring gear 162. An interior of ring gear 162 mates or is keyed with a vertical axle or shaft 170. Shaft 170 is co-linear with axis 100 of rotation of cartridge transport assembly 92. Shaft 170 extends through unillustrated bearings retained in mounting block 140. Moreover, shaft 170 is surmounted by a truncated circular cap 172 to which cartridge transport assembly 92 is mounted via unillustrated fasteners (see FIG. 5-2). The bore 150 internally receives an unillustrated member which in turn has an aperture counterthreaded to receive threaded shaft 114. Retention members are provided at both ends of the counterthreaded member to secure the counterthreaded member within mounting block 140.

Ribbon Cable Routing

The cartridge transport assembly 92 carries an electronic device, such as a barcode reader assembly 180. Power and electrical signals are carried from circuit board 76 to barcode reader assembly 180 by a flexible ribbon cable 182. As shown in FIG. 2, the ribbon cable 182 travels from circuit board 76 toward tray 110, and is retained on the upturned rear edge of tray 110 by clips 184 and 186. Clip 184 affixes ribbon cable 182 to the rear edge of tray 110 near the left side of cartridge library 20; clip 186 affixes the ribbon cable 182 to the rear edge of tray 110 near the center of cartridge library 20 in the width dimension. Moreover, at clip 186 the ribbon cable 182 has an essentially U-shaped bend, and then travels toward mounting block 140.

In mounting block 140 the ribbon cable 182 extends through a chamber 188 prior to traveling to cartridge transport assembly 92. FIG. 5-2 shows chamber 188 without the ribbon cable 182. The chamber 188 is essentially cylindrical and concentric with axis 100 of rotation of cartridge transport assembly 92, and thus concentric with respect to shaft 170. The chamber 188 has a circumferential aperture 190 through which the ribbon cable 182 enters chamber 188. The circumferential aperture 190 is elongated in a direction parallel to axis 100 of rotation of cartridge transport assembly 92. The mounting block 140 has a bulbous protrusion 192 proximate the circumferential aperture 190, e.g., at an edge of circumferential aperture 190 as shown in FIG. 5-2.

FIG. 5-3 resembles FIG. 5-2, but further shows the ribbon cable 182 within chamber 188. FIG. 5-3 also shows, as does FIG. 5-4 in more detail, how the ribbon cable 182 is bent upon itself to form a ribbon cable segment 194 which travels substantially in the Z direction up toward the cartridge transport assembly 92. Thus, ribbon cable 182 exits chamber 188 in a direction parallel to axis 100 of rotation of cartridge transport assembly 92. In other words, ribbon cable 182 exits chamber 188 in a direction parallel to an axis about which chamber 188 is coiled. Further, FIG. 5-3 illustrates a clip 196 which sandwiches ribbon cable 182 between itself and the bulbous protrusion 192, thereby restraining movement of ribbon cable 182 at bulbous protrusion 192.

As evident from FIG. 5-3, in chamber 188 the ribbon cable 182 is carried in a variable coiled configuration to accommodate rotation of the robot. By "variable coiled configuration" is meant that in chamber 188 the ribbon cable 182 has a first degree of coiling when cartridge transport assembly 92 rotates to its first position, and a second degree of coiling when cartridge transport assembly 92 rotates to its second position. In the first position of cartridge transport assembly 92 (at which cartridge transport assembly 92 faces the library front section), the first degree of coiling of ribbon cable 182 within chamber 188 is 4.0 coils of ribbon cable 182 as shown in FIG. 5—5. In the second position of cartridge transport assembly 92 (at which cartridge transport assembly 92 faces the library rear section), the second degree of coiling of ribbon cable 182 within chamber 188 is 3.5 coils of ribbon cable 182 as shown in FIG. 5-6.

Cartridge Magazine

Figures 5, 6:
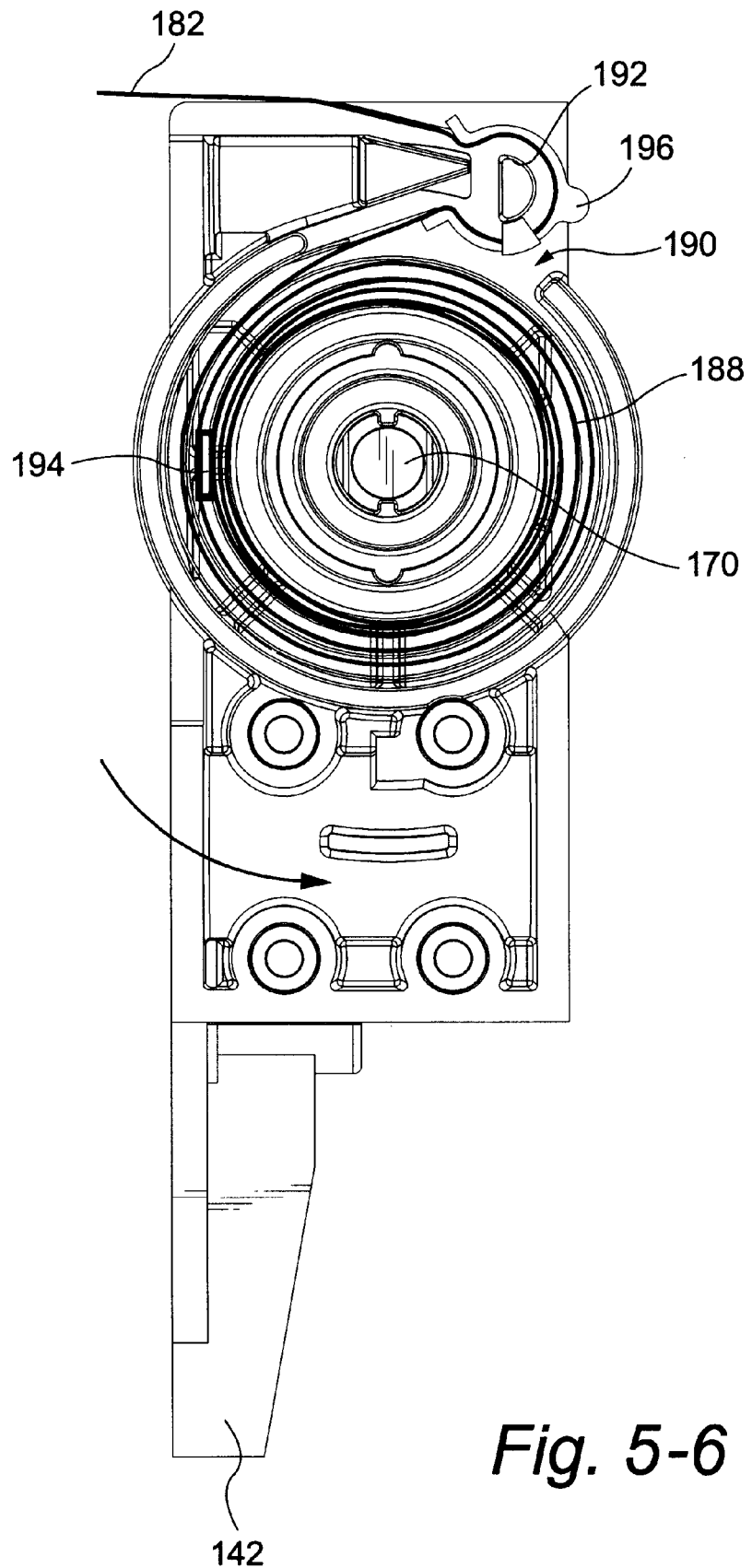
Figure 6:
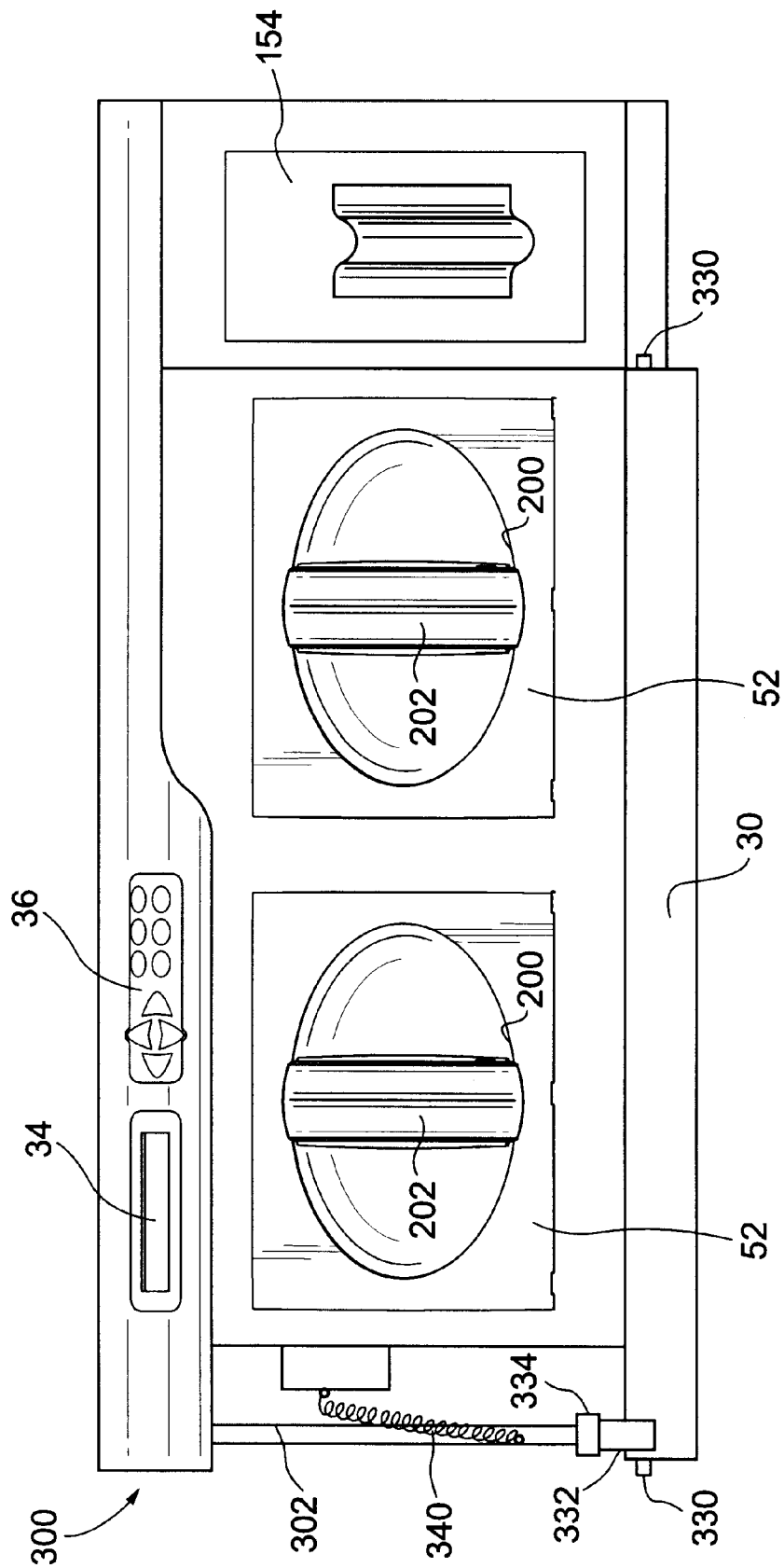

FIG. 6 shows the frame front wall 22 of cartridge library 20, with door 30 open. Thus, in contrast to FIG. 1, in FIG. 6 the cartridge magazines 52 are visible. Each of the cartridge magazines 52 has an oval depression 200 formed in a front surface thereof. Opposite major edges of the oval depression 200 are bridged by a vertically extending handle 202.

Figures 1, 7:
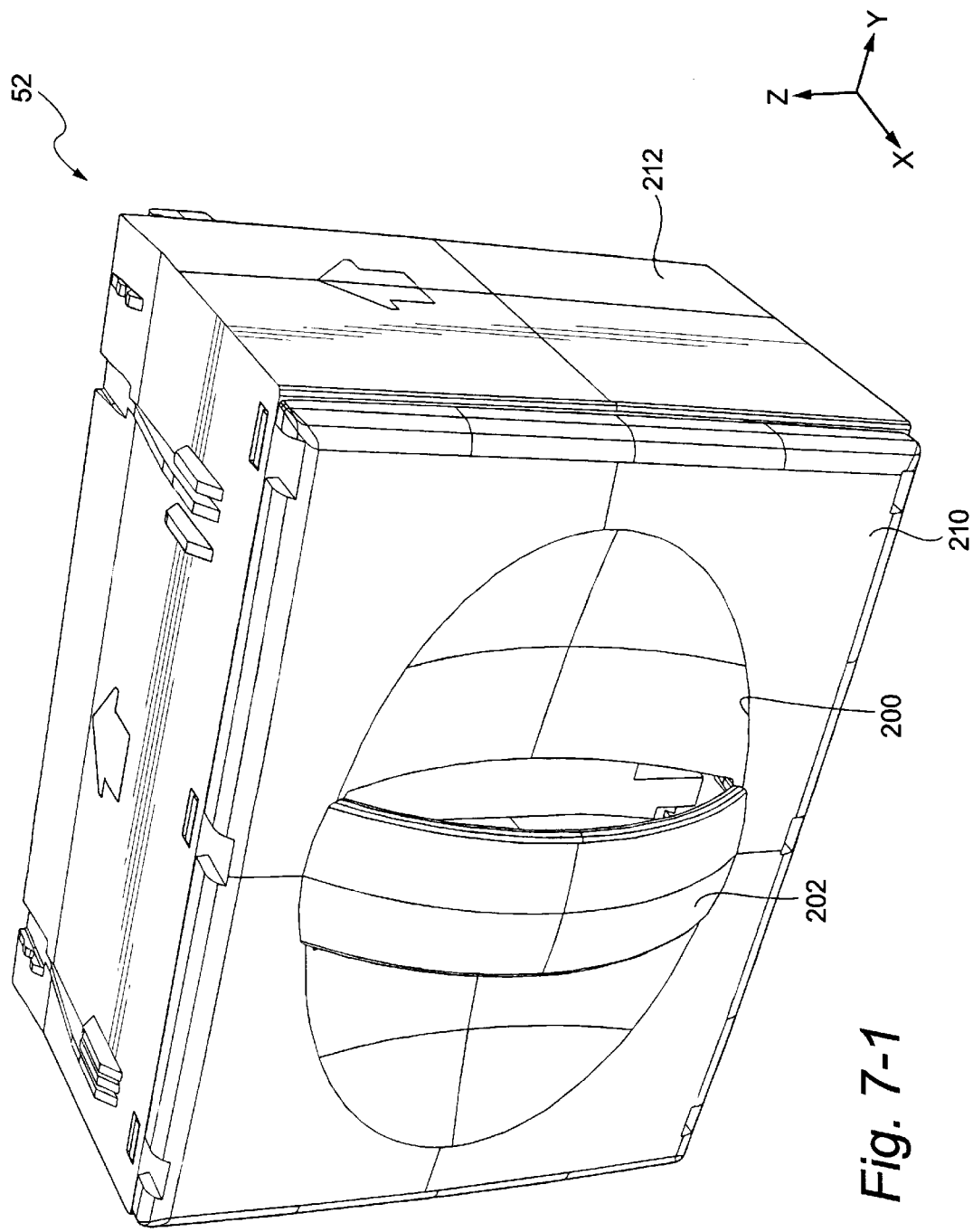
Figures 4, 7:
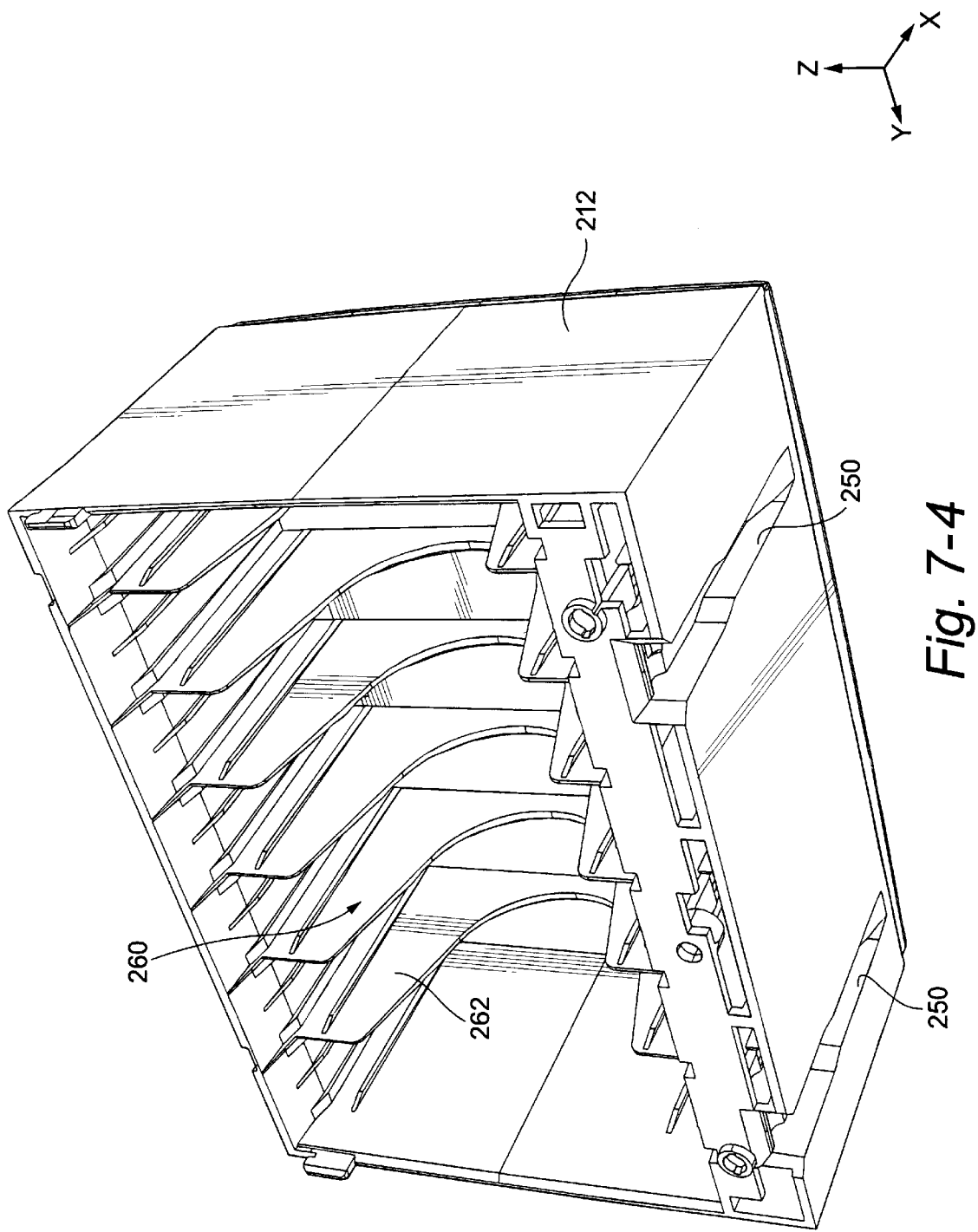

FIG. 7-1 shows a cartridge magazine 52 according to one illustrative, nonlimiting example embodiment of the invention. The cartridge magazine 52 has a magazine lid 210 and a magazine body 212. FIG. 7-2 shows magazine lid 210 detached from magazine body 212. FIG. 7-3 shows magazine body 212 without magazine lid 210. The magazine lid 210 has hinge-forming projections 220 formed on a top edge thereof. The hinge-forming projections 220 mate with corresponding apertures 222 formed in magazine body 212, in the manner shown in FIG. 7-5. In addition, magazine lid 210 has lid closing projections 230 formed on its front edge. The lid closing projections 230 engage corresponding ramps 232 formed on the inside of magazine body 212.

The magazine body 212 has magazine retention ramps 240 formed on its top surface (see FIG. 7-3). The magazine retention ramps 240 serve to retain the cartridge magazine 52 in magazine cavity 50. The magazine cavity 50 has unillustrated ball-like detents which are biased to bear downward on magazine retention ramps 240. With exertion of a sufficient force to withdraw the cartridge magazine 52 from magazine cavity 50, the downward biasing of the ball-like detents is overcome to permit retrieval of the cartridge magazine 52. The downward biasing of the ball-like detents is overcome to permit retrieval of the cartridge magazine 52 from magazine cavity 50.

The magazine body 212 also has magazine alignment grooves 250 formed on its bottom surface (see FIG. 7-4). The magazine alignment grooves 250 slide over corresponding guide ramps formed on a bottom wall which defines magazine cavity 50.

FIG. 7-4 also shows the cartridge-accommodating cells 260 of cartridge magazine 52. For the particular cartridge magazine 52 illustrated, the cartridge-accommodating cells 260 are at least partially defined by ribs 262. In the illustrated embodiment, a cartridge magazine 52 has six such ribs 262 for delineating seven cartridge accommodating cells 260. As previously mentioned, the present invention is not to be limited by the cartridge capacity of the cartridge magazine 52, as a greater or lesser number of ribs can be utilized.

Further details of cartridge magazine 52 can be seen with reference to U.S. Design patent application Ser. No. 29/132,407, entitled "CARTRIDGE MAGAZINE", which is incorporated herein by reference.

Over Insertion Protection for Cartridges in Magazines

As understood from the foregoing, when door 30 is open the cartridge magazines 52 can be inserted into magazine cavity 50. The cartridge magazines 52 have cells 260 for accommodating the media cartridges 64. As situated in the cartridge magazine 52, a reference surface or reference edge of the media cartridges 64 is oriented toward the transport actuator and guide region 90, e.g., toward cartridge transport assembly 92. As used herein, reference surface or reference edge of a media cartridge 64 is an edge of the cartridge which either bears a barcode or other cartridge-distinguishing indicia, or which constitutes a lid of the cartridge which is opened upon insertion of the cartridge into one of the drives 60.

There is the possibility that, if left unrestrained, the inertia experienced by a media cartridge 64 when its cartridge magazine 52 is inserted into magazine cavity 50 may cause the reference edge of the cartridge to protrude too far toward cartridge transport assembly 92. That is, a leading or reference edge of a media cartridge 64 in one of the cartridge-accommodating cells 260 may, upon insertion of the cartridge magazine 52 into the magazine cavity 50, be jarred or otherwise cajoled so that the media cartridge 64 is no longer precisely located in its cell 260, but rather protrudes beyond the normal storage position. Protrusion of the leading or reference edge of a media cartridge 64 in such manner is problematic, as it can not only jeopardize successful engagement and release of the protruding cartridge by cartridge transport assembly 92, but interfere with the operation of cartridge transport assembly 92 generally (e.g., when attempting to pick or place other cartridges).

The possibility of cartridge over-insertion as above described is countered in accordance with an aspect of the present invention. In particular, the present invention includes in one of its aspects a cartridge restraint assembly 300 which, upon movement of the library door 30 from its door closed position to its door open position, responsively moves into a cartridge restraint position to prevent over positioning of a media cartridge 64 situated in a cartridge magazine 52.

Figures 1, 8:
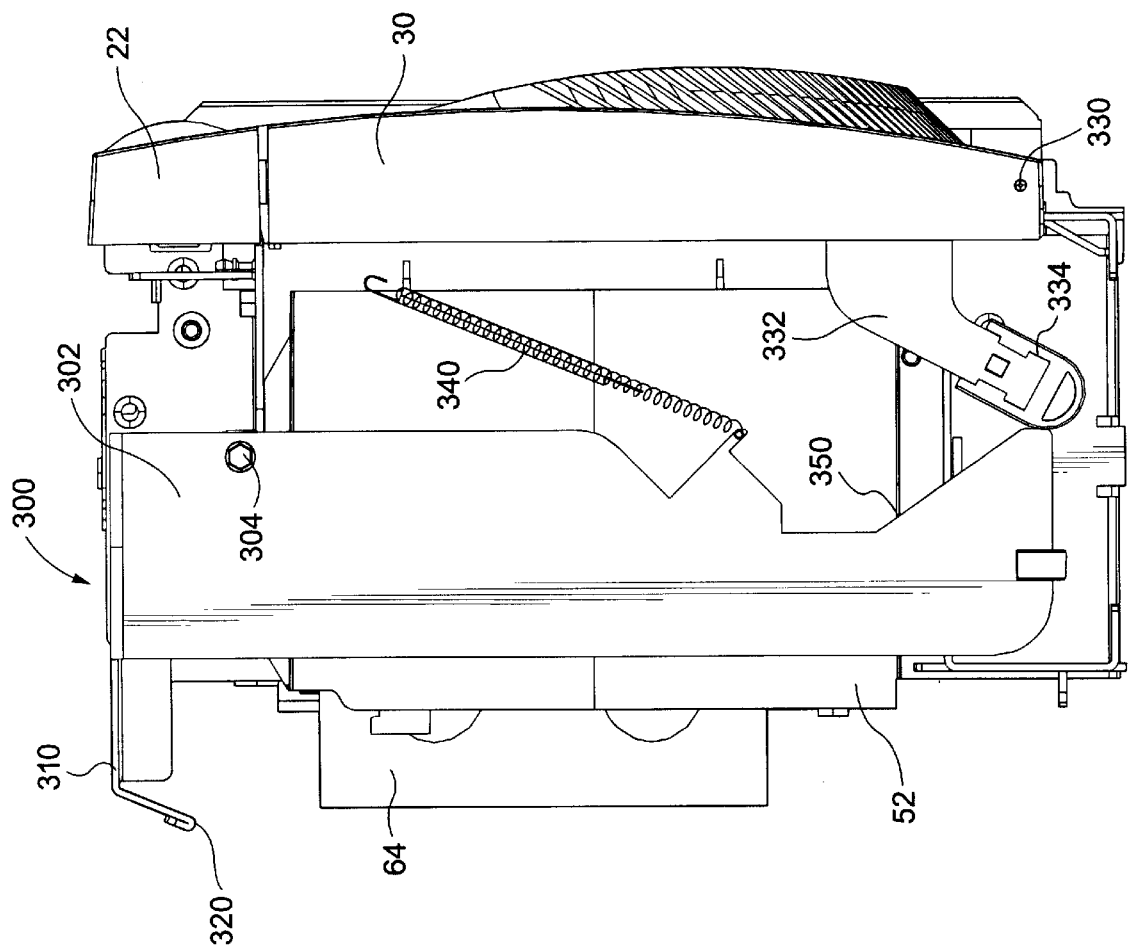
Figures 2, 8:
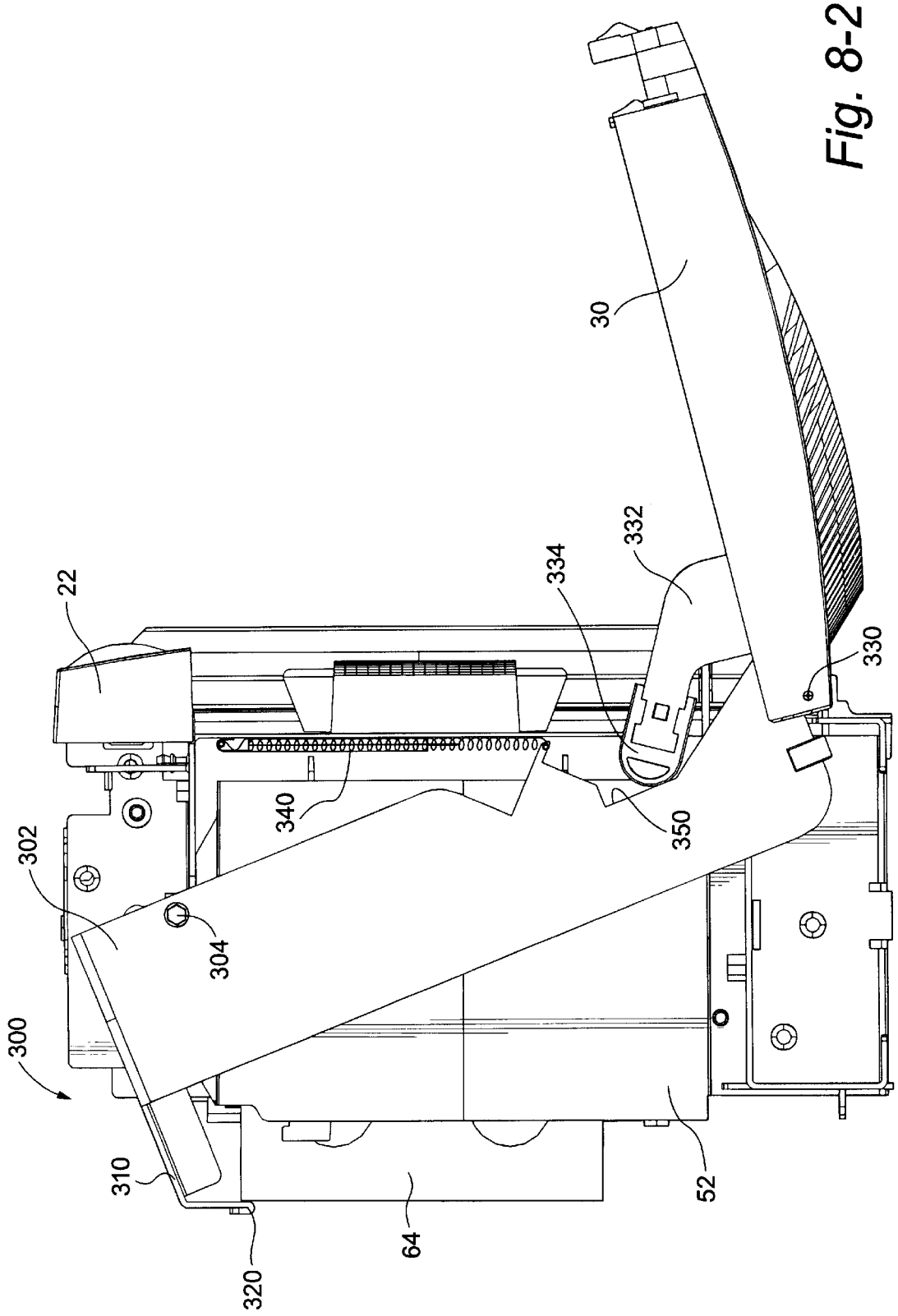
Figures 3, 8:
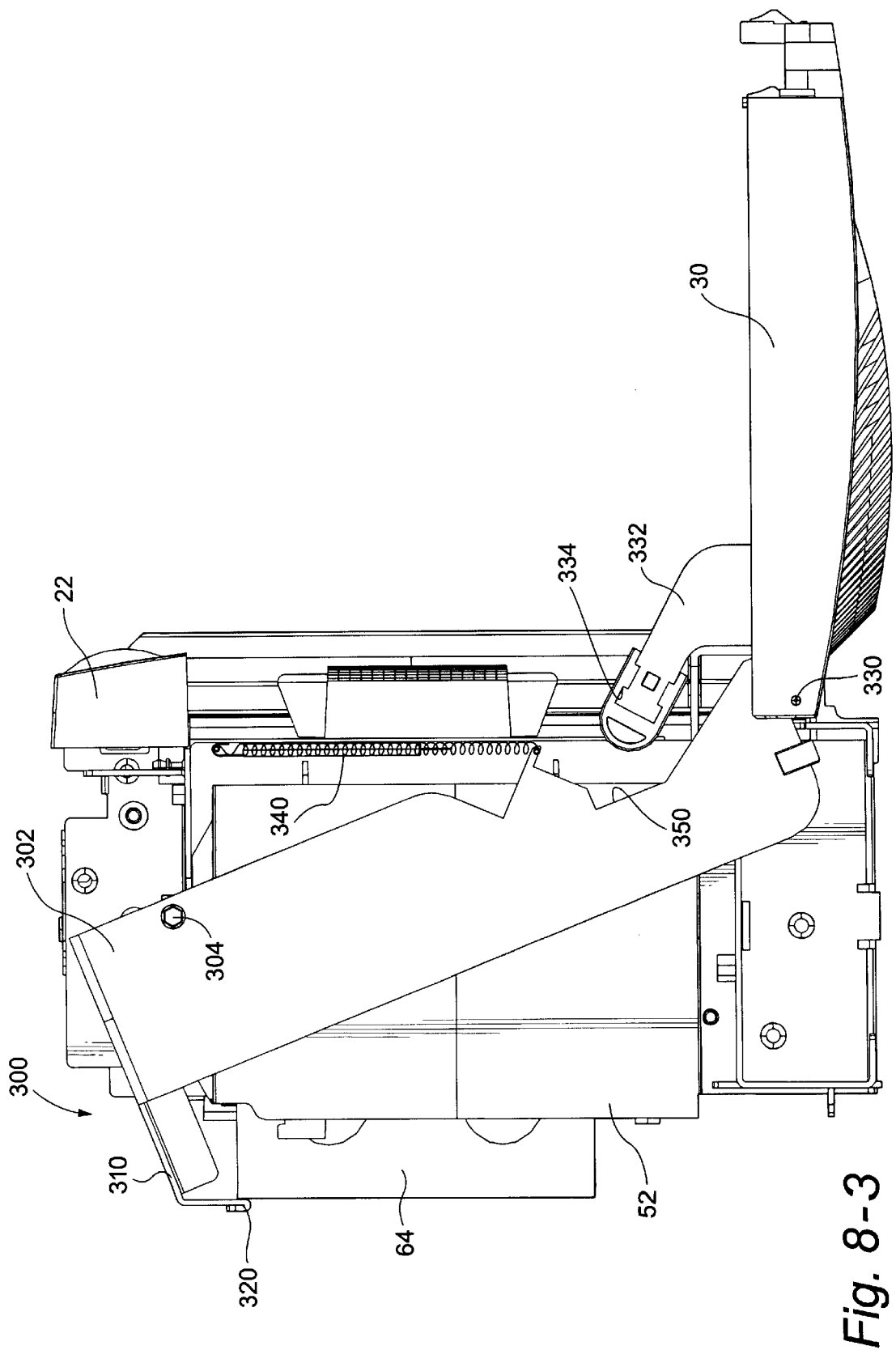

The structure and operation of cartridge restraint assembly 300 is understood with reference to FIG. 8-1 through FIG. 8-3, all of which are left side views of a library front section with library cover 26 removed. The cartridge restraint assembly 300 comprises a pivoting lever 302 situated at the front left side of cartridge library 20. The pivoting lever 302 is pivotally attached to the library frame at a pivot point 304, the pivot point 304 having a horizontal axis. At its top, the pivoting lever 302 has a visor 310 formed thereon. As shown in FIG. 2, visor 310 extends across the top of the portion of the library front section over magazine cavity 50, e.g., over the two cartridge magazines 52. At its right edge, visor 310 is bend downwardly to form a tab 312. The tab 312 is pivotally attached at pivot point 314 to a frame wall 316. The frame wall 316 delineates the magazine cavity 50 from a space occupied by entry/exit port module 54. The pivot point 314 is aligned with pivot point 304.

The visor 310 has a leading edge 320. When the cartridge restraint assembly 300 is in the cartridge restraint position shown in FIG. 8-2 and FIG. 8-3, the visor leading edge 320 obstructs travel of a media cartridge 64 past a cartridge insertion limit position (e.g., past the normal storage position of a media cartridge 64 in its cartridge accommodating cell 260).

The library door 30 is pivotally attached to the library frame at door pivot point 330. Further, on its lower left bottom edge, door 30 has an inverted L-shaped bracket 332 extending rearwardly therefrom. At its distal end, bracket 332 carries a cam follower 334. The cam follower 334 can be formed using a suitable lubricated plastic, e.g, Delrin.

As explained below, the pivoting lever 302 is biased to its cartridge restraining position (shown in FIG. 8-2 and FIG. 8-3) by biasing spring 340. The biasing spring 340 has a first end connected to a vertical wall of the library frame, and a second end connected to pivoting lever 302. However, when the door 30 is closed, the biasing force exerted by biasing spring 340 is overcome, whereupon the pivoting lever 302 assumes its erect, non-restraining position (e.g., the pivoting lever 302 is essentially perpendicular to the library floor in the manner depicted in FIG. 8-1).

On its front lower edge, the pivoting lever 302 has cam surface 350 formed thereon. The cam surface 350 is primarily comprised of two segments. As illustrated in FIG. 8-1, the first segment of cam surface 350 is viewed as being ramped or inclined when pivoting lever 302 is in its erect (non-restraining) position. The second segment of cam surface 350 is viewed as vertical when pivoting lever 302 is in its erect (nonrestraining) position.

As shown in FIG. 8-1, when door 30 is in its closed position, the cam follower 334 bears only against a lowermost point of pivoting lever 302. This point is below door pivot 330 and thus the fully extended spring acts to help hold door 30 in its closed position. Pivoting lever 302 assumes its erect or non-restraining position when door 30 is closed.

FIG. 8-2 shows the door 30 in a partially opened position, e.g., pivoting about point 330. The pivoting of door 30 about door pivot point 330 causes cam follower 334 to follow the cam surface 350, thereby allowing biasing spring 340 to apply force to pivoting lever 302 to cause pivoting lever 302 to pivot about pivot point 304. The pivoting lever 302 thus pivots about its pivot point 304 to the cartridge restraint position shown in FIG. 8-2. In the cartridge restraint position shown in FIG. 8-2, the visor 310 (preferably being integral with or at least connected to pivoting lever 302) has also pivoted about pivot point 304, so that leading edge 320 of visor 310 restrains the media cartridges 64 in cartridge magazine 52 from protruding beyond their normal storage position in their respective cartridge-accommodating cells 260. Thus, the leading edge 320 of visor 310 precludes over insertion of the media cartridges 64 in cartridge magazine 52, so that no improperly protruding media cartridge 64 will interfere with operation of cartridge transport assembly 92 or otherwise present a problem.

FIG. 8-3 shows door 30 in a fully opened position, at which time biasing spring 340 still has some exertion on pivoting lever 302, so that pivoting lever 302 remains in its cartridge restraint position.

Thus, pivoting lever 302 has cam surface 350 formed thereon, and door 30 has a cam follower 334 which contacts cam surface 350 during a least a portion of one of a door opening and a door closing operation. When door 30 is in the door closed position, a contact point of cam follower 334 and cam surface 350 is below door pivot point 330.

The above-describe action is essentially reversed upon closing of door 30. As understood from the foregoing, the visor 310 of cartridge restraint assembly 300 is pivoted back away from cartridge magazines 52 when the door 30 is closed. In pivoting away to no longer form a stop for media cartridges 64 in cartridge magazine 52, the visor 310 is also out of the way of cartridge transport assembly 92.

Entry/Exit Port

As previously indicated, the entry/exit port module 54 is on the right side of the cartridge library 20 in the library front portion. The entry/exit port module 54 permits a user to insert or withdraw a single media cartridge 64 from cartridge library 20 while the cartridge library 20 is in operation, without having to open library door 30. Access to entry/exit port module 54 is gained by pivoting the entry/exit port cover 32 from its closed position (shown in FIG. 9-1) to its open position (shown in FIG. 9-2).

Figures 1, 9:
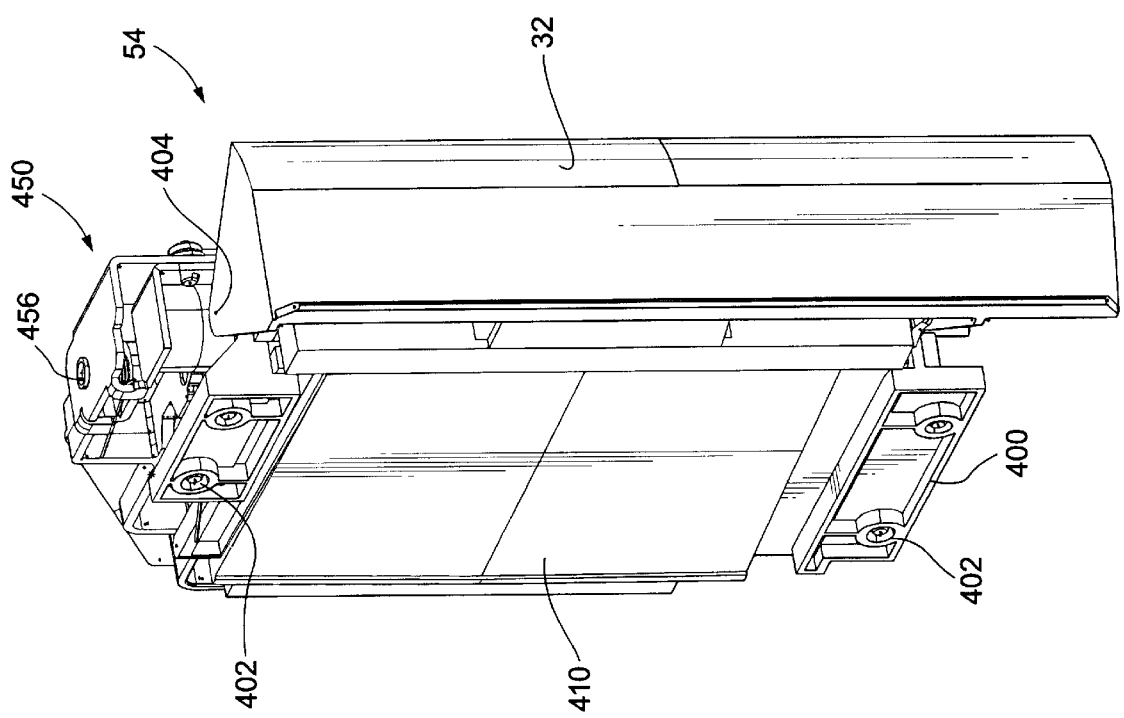
Figures 2, 9:
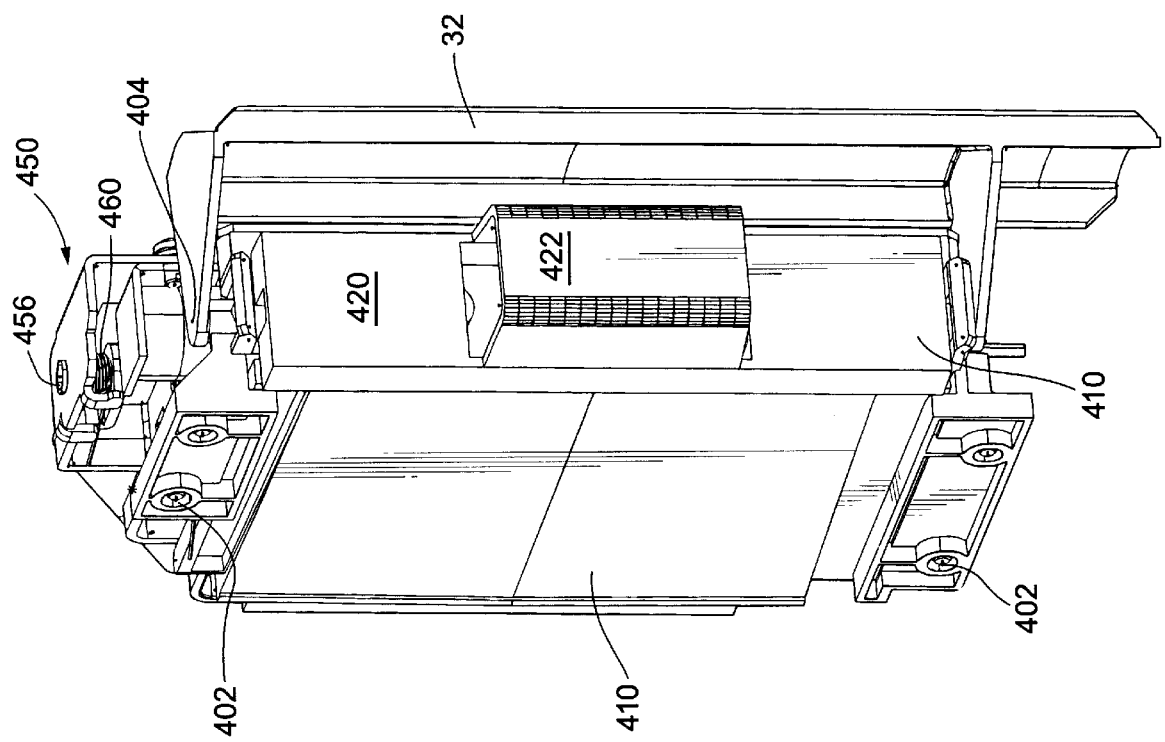
Figures 3, 9:
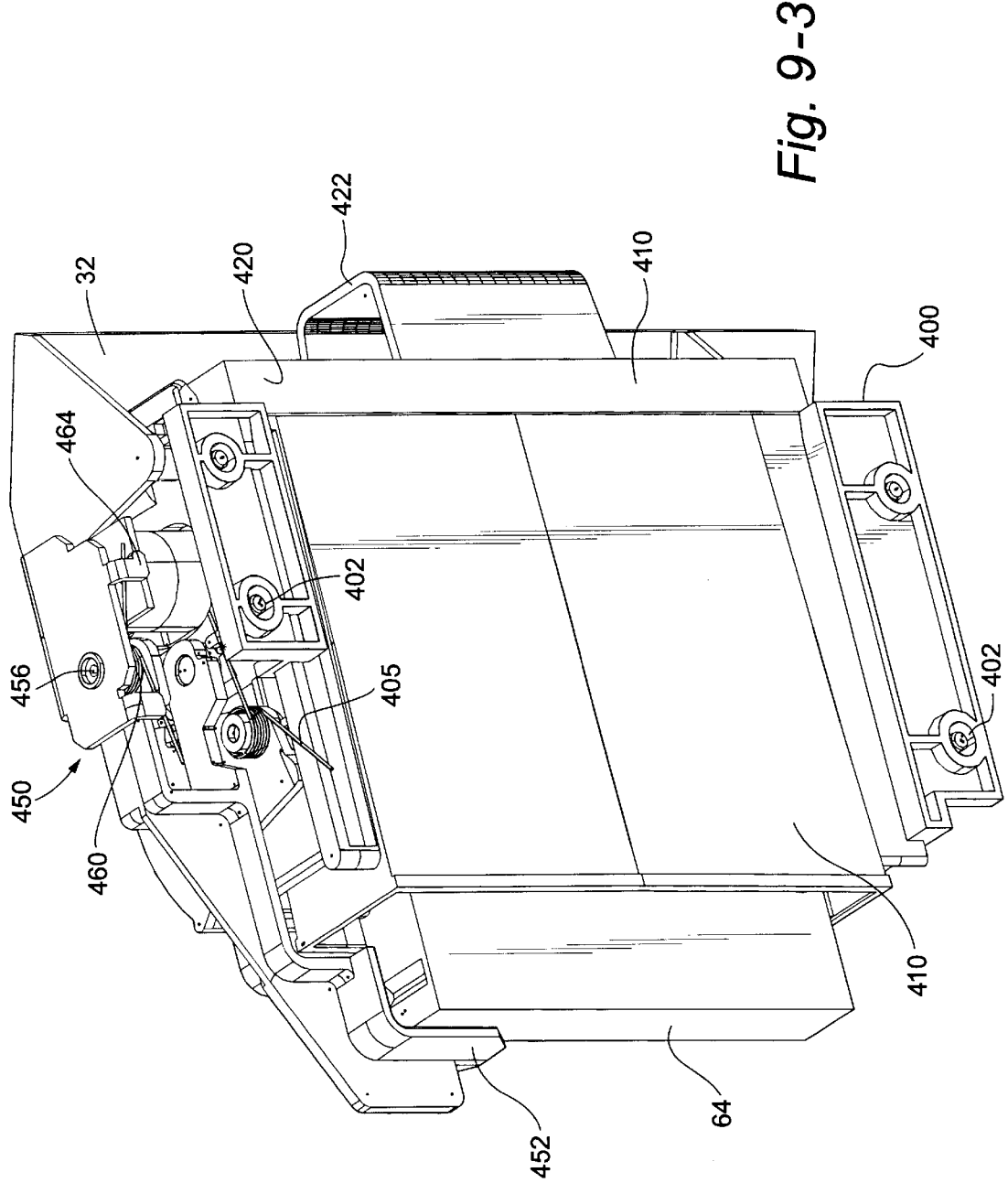
Figures 4, 9:
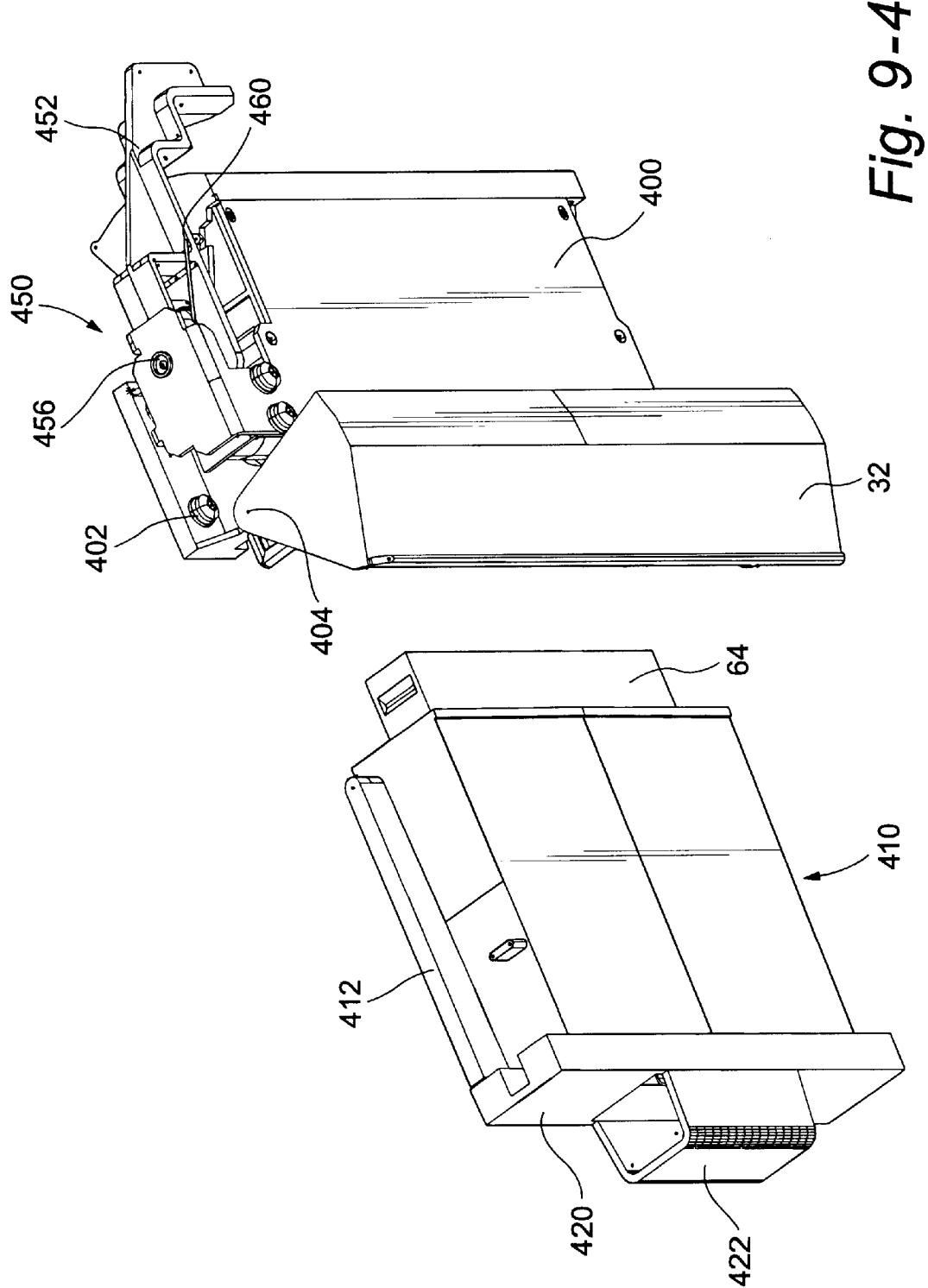
Figures 5, 9:
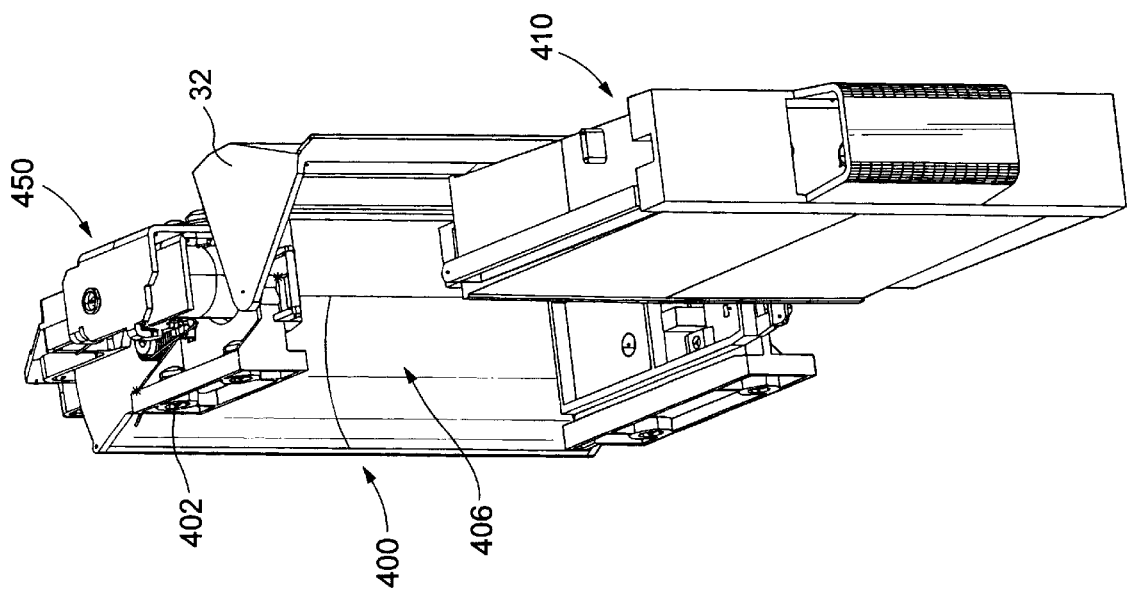
Figures 6, 9:
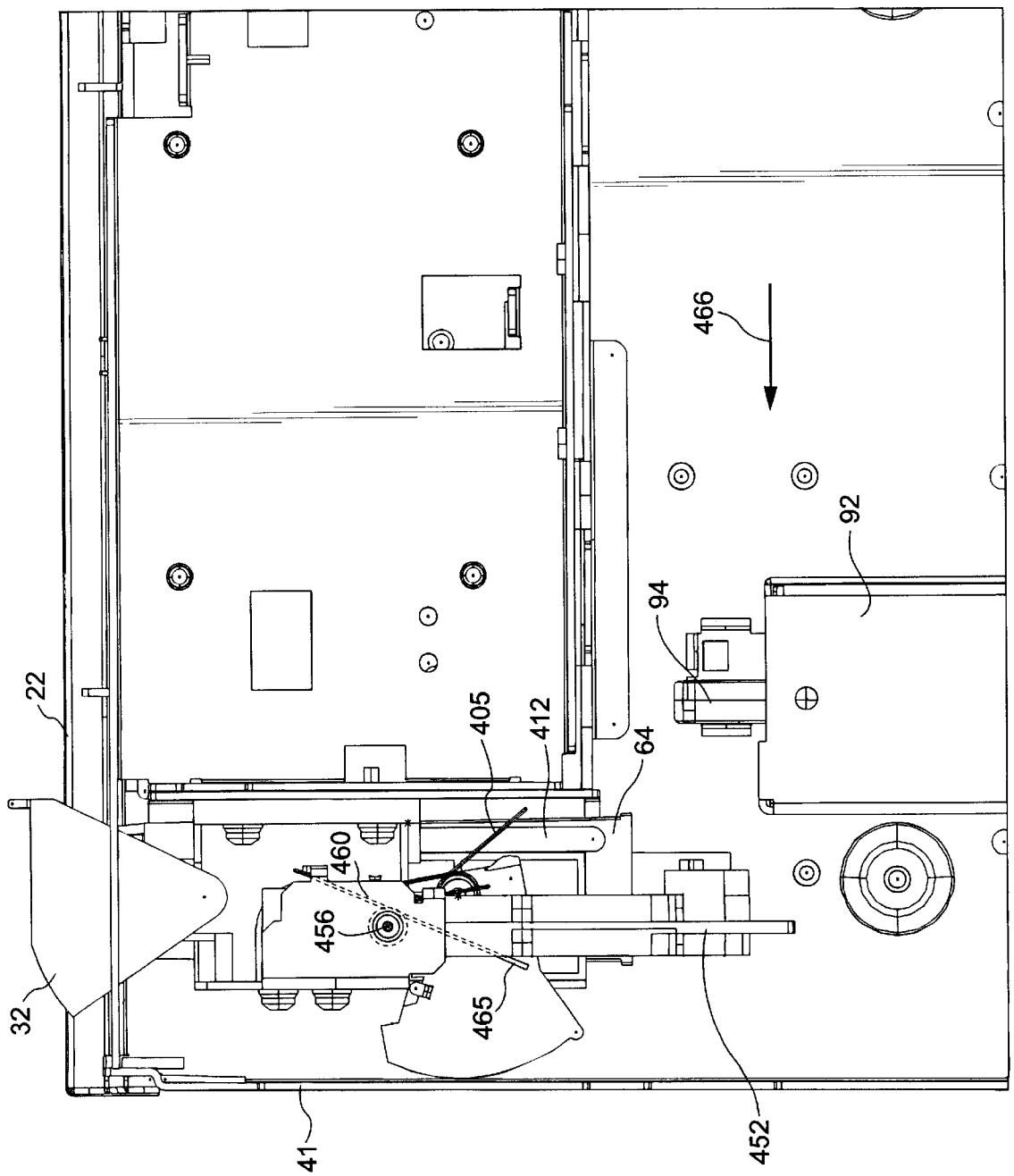
Figures 7, 9:
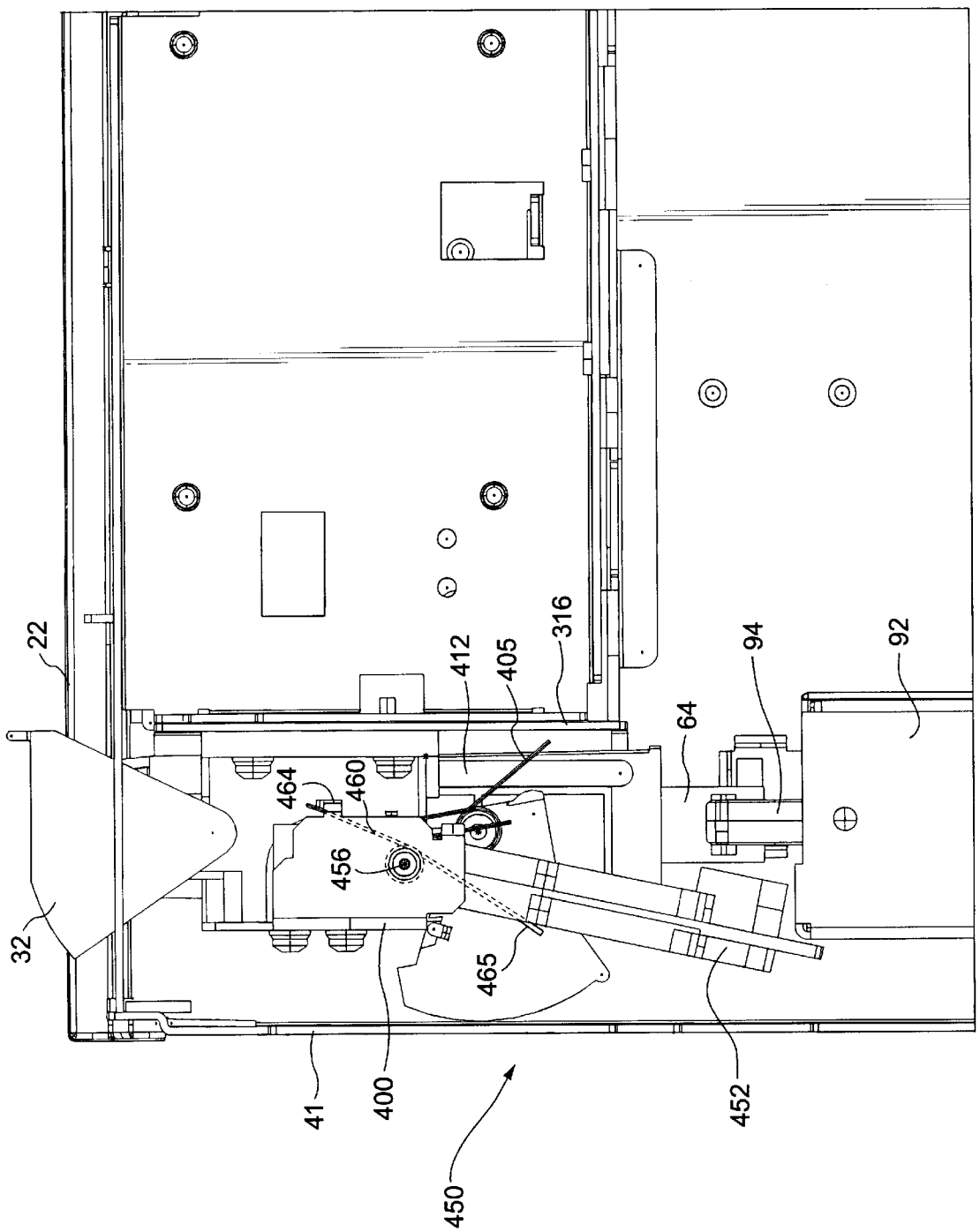

As shown (for example) in FIG. 9-1, the entry/exit port module 54 has a entry/exit port housing 400 which attaches to frame wall 316 (see FIG. 2) via fasteners which extend through mounting apertures 402. The entry/exit port cover 32 is pivotally attached to entry/exit port housing 400 at pivot point 404. The entry/exit port cover 32 is biased in its closed position by a biasing spring 405 (see FIG. 9-3). When open (as shown in FIG. 9-2), entry/exit port cover 32 exposes a entry/exit port caddy 410.

The entry/exit port housing 400 defines an essentially hollow rectangular volume. An interior cavity 406 in entry/exit port housing 400 (see FIG. 9-5) slidingly receives the entry/exit port caddy 410, as understood from FIG. 9-4 and FIG. 9-5, for example. It is the entry/exit port caddy 410 which actually contains the media cartridge 64 which is to be inserted into, or withdrawn from, cartridge library 20 via the entry/exit port module 54.

To accommodate the media cartridge 64, the entry/exit port caddy 410 has the shape of an essentially hollow rectangular volume, but sized smaller than the entry/exit port housing 400 in order to slide into the interior cavity 406 formed in entry/exit port housing 400. The interior cavity formed in entry/exit port caddy 410 is sized to accommodate the particular size and type of media cartridge 64 being handled by the cartridge library 20. To guide insertion of the entry/exit port caddy 410 into entry/exit port housing 400, the entry/exit port caddy 410 is provided with an alignment key 412 on its top surface (see FIG. 9-4). On an edge opposite its cartridge-receiving mouth, the entry/exit port caddy 410 has an enlarged caddy spine 420. A U-shaped caddy grip handle 422 is provided on the caddy spine 420.

As in the case with media cartridges 64 in the cartridge magazines 52, there is the possibility that, if left unrestrained, a cartridge overinsertion could occur in entry/exit port module 54. That is, a media cartridge 64 held in the entry/exit port caddy 410 of entry/exit port module 54 could protrude too far into the interior of the cartridge library 20, e.g., too far toward transport actuator and guide region 90. Such cartridge protrusion could interfere with the workings of cartridge library 20, and with operation of cartridge transport assembly 92 in particular.

To avoid against cartridge overinsertion at the entry/exit port module 54, the entry/exit port housing 400 has an entry/exit port cartridge overinsertion protection assembly 450. The entry/exit port cartridge overinsertion protection assembly 450 is mounted on the top of entry/exit port housing 400. The entry/exit port cartridge overinsertion protection assembly 450 includes a pivoting cartridge limit finger 452 which, when in its overinsertion protection position (shown, e.g., in FIG. 9-3 and FIG. 9-6), provides a stop or limit surface for a reference edge of a media cartridge 64 in entry/exit port caddy 410.

The cartridge limit finger 452 is pivotally attached to entry/exit port housing 400 at finger pivot point 456. The cartridge limit finger 452 is biased to its overinsertion protection position by entry/exit port finger biasing spring 460. One leg of biasing spring 460 contacts finger 452; the other leg of biasing spring 460 is grounded against housing 400, and particularly against a tab 464 provided on housing 400 to keep finger 452 biased to the overinsertion protection position (see FIG. 9-3). The other end 465 of spring 460 bears against the finger 452 as shown, e.g., in FIG. 9-4 and FIG. 9-7.

The cartridge limit finger 452 thus serves as a cartridge restraint member situated at the entry/exit port to prevent overpositioning of a media cartridge 64 inserted into the entry/exit port. As explained below, the cartridge restraint member in the form of cartridge limit finger 452 is repositionable by cartridge transport assembly 92 when the cartridge transport assembly 92 seeks to obtain or deposit a cartridge at entry/exit port module 54. In particular, the cartridge limit finger 452 is pivoted away from a cartridge restraint position (also referred to as the overinsertion protection position), by the cartridge transport assembly 92 when cartridge transport assembly 92 seeks to obtain or deposit a media cartridge 64 at entry/exit port module 54.

In the above regard, FIG. 9-6 shows, from above, the cartridge transport assembly 92 approaching the entry/exit port module 54 (e.g., linearly reciprocating from the right to the left in FIG. 9-6 in the direction depicted by arrow 466). At the time shown in FIG. 9-6, the cartridge limit finger 452 is in its cartridge restraint position (overinsertion protection position). That is, the cartridge limit finger 452 is biased to extend essentially perpendicularly to frame front wall 22 (e.g., parallel to frame side wall 41). As such, cartridge limit finger 452 forms a limit stop against which the reference edge of media cartridge 64 cannot protrude.

As the cartridge transport assembly 92 moves further leftwardly in the direction depicted by arrow 466, the leading side edge of cartridge transport assembly 92 eventually contacts cartridge limit finger 452, and pivots cartridge limit finger 452 about its pivot point. Upon pivoting of cartridge limit finger 452 away from media cartridge 64 to the finger clearance position (shown from the top in FIG. 9-7 and perspectively in FIG. 9-8), access to the media cartridge 64 in entry/exit port caddy 410 of entry/exit port module 54 is unobstructed by cartridge limit finger 452.

When the cartridge limit finger 452 has been displaced (e.g., pivoted) to its finger clearance position as shown in FIG. 9-7 and FIG. 9-8, the cartridge transport assembly 92 can engage a media cartridge 64 contained in entry/exit port caddy 410. Alternatively, if there is no media cartridge 64 in entry/exit port caddy 410 but instead a media cartridge 64 held by cartridge transport assembly 92, the cartridge transport assembly 92 can deposit the media cartridge 64 in entry/exit port caddy 410.

When the cartridge transport assembly 92 leaves the area of entry/exit port module 54, the cartridge transport assembly 92 no longer bears against cartridge limit finger 452. Without cartridge transport assembly 92 overcoming the biasing force of entry/exit port finger biasing spring 460, the cartridge limit finger 452 returns to its cartridge restraining position as shown in FIG. 9-6, for example.

Barcode Reader Assembly

Figures 1, 10:
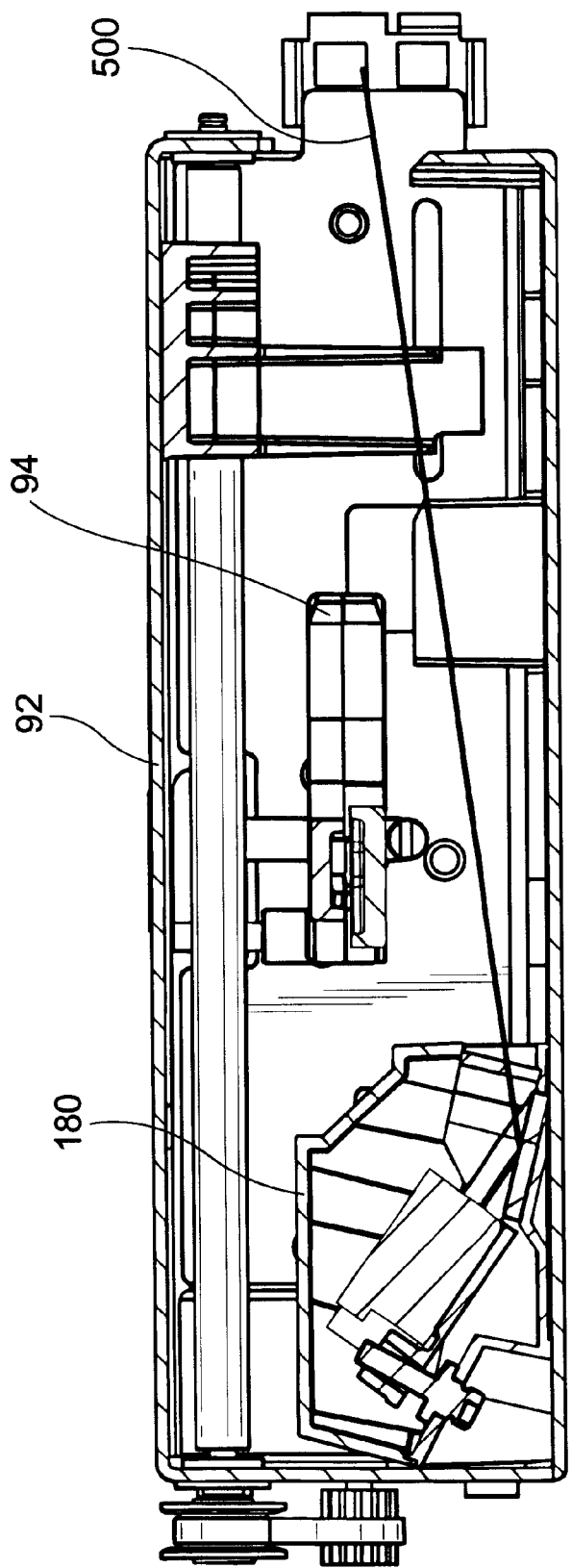
Figures 2, 10:
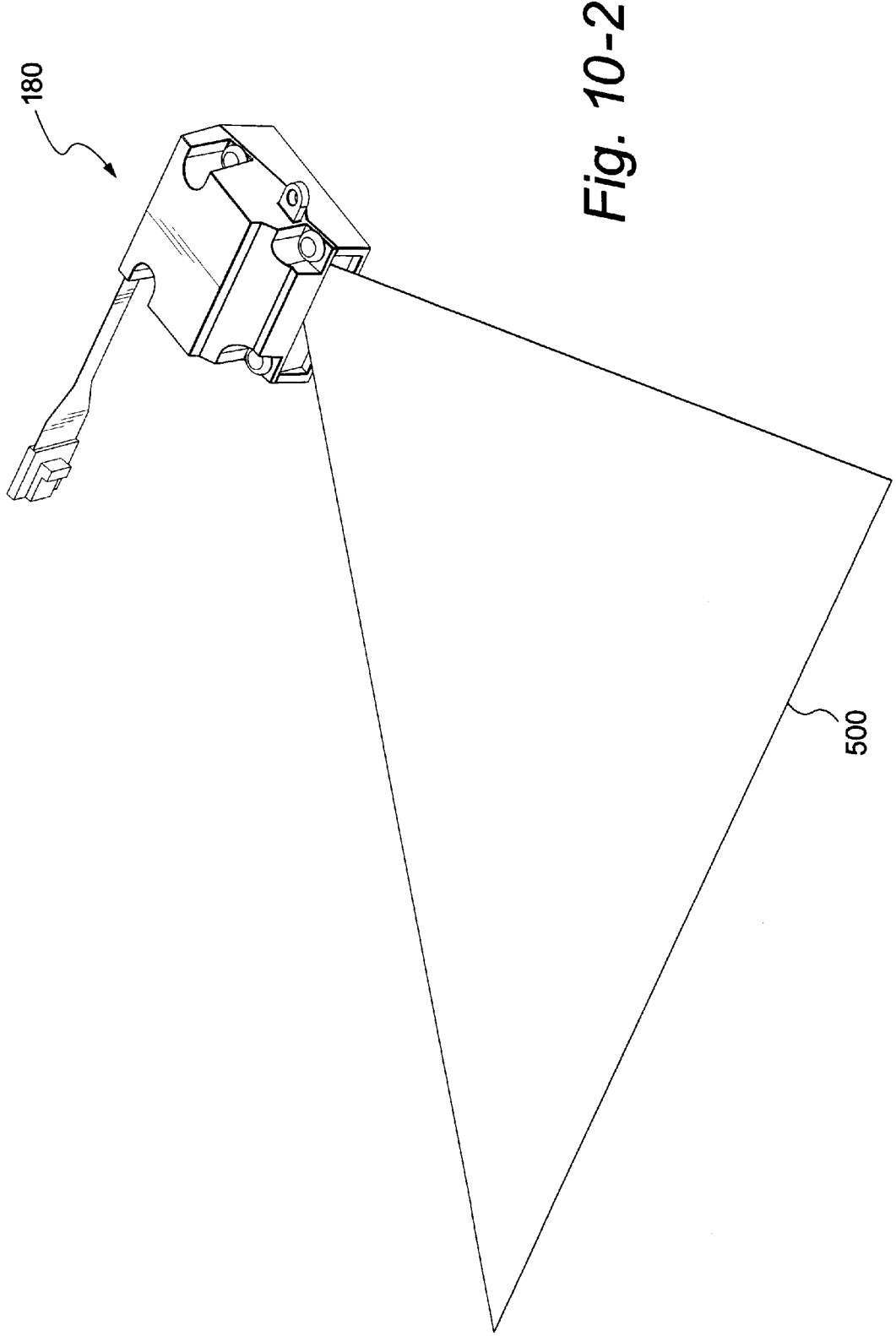
Figures 3, 10:
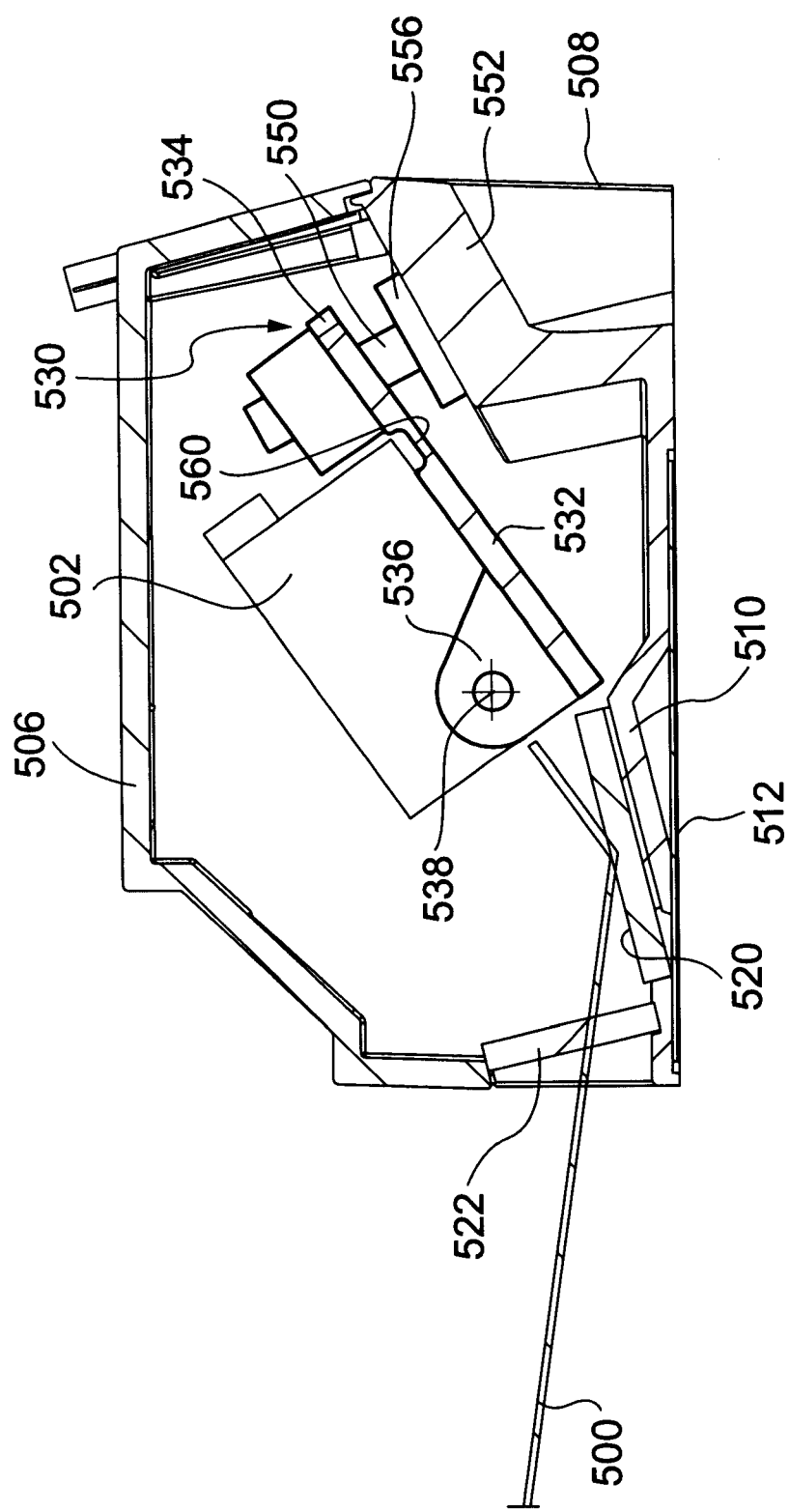
Figures 4, 10:
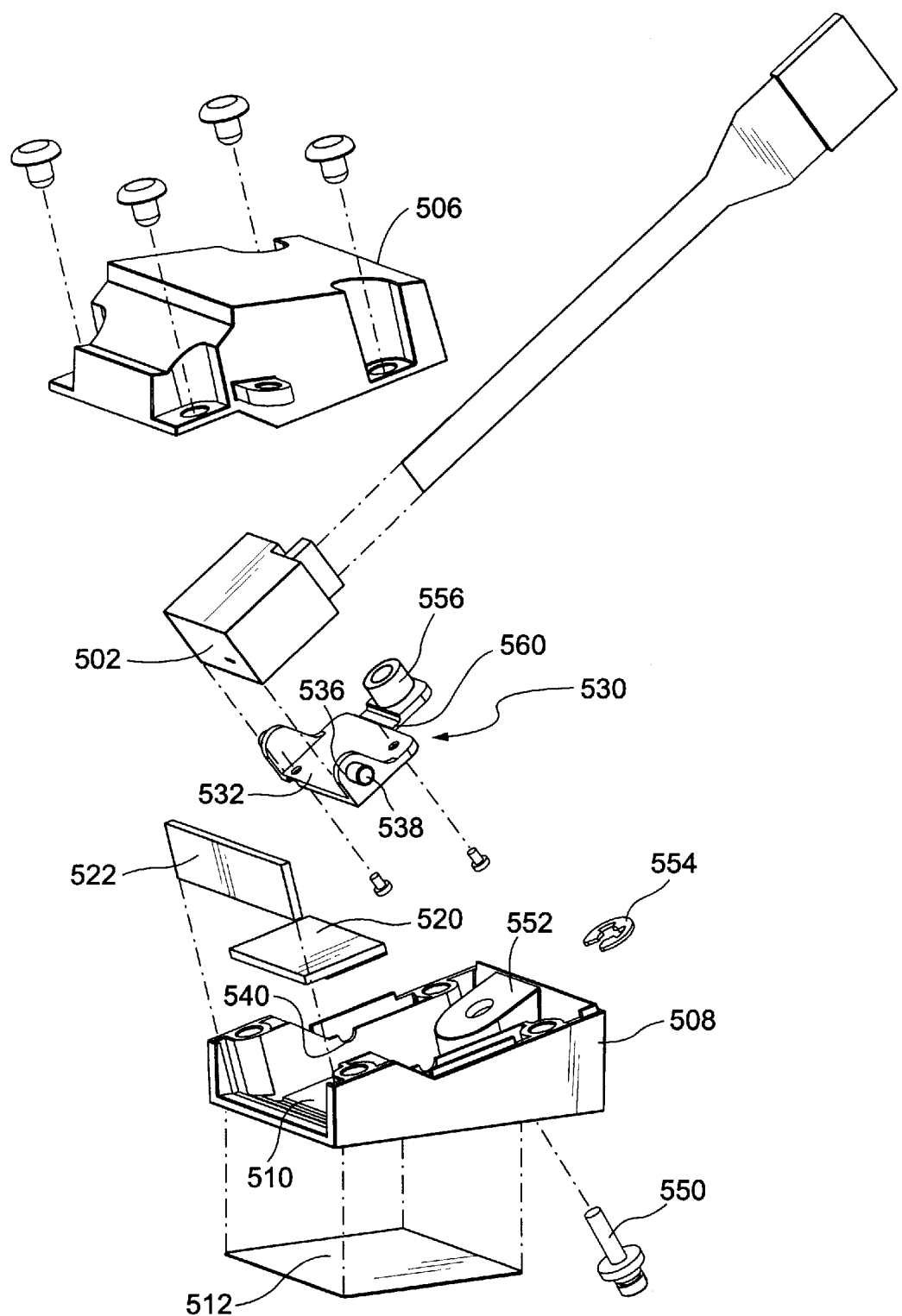

The barcode reader assembly 180, seen mounted in cartridge transport assembly 92 in FIG. 5-1, is further illustrated in FIG. 10-1 through FIG. 10-4. FIG. 10-1 is a top cross sectional view of cartridge transport assembly 92, and particularly shows the location of barcode reader assembly 180 within cartridge transport assembly 92. Also incidentally shown in FIG. 10-1 is the top one of the picker fingers 94, in a retracted position (e.g., internally contained within cartridge transport assembly 92). FIG. 10-1 also shows how a beam 500 is emitted from barcode reader 502 contained within barcode reader assembly 180. Beam 500 is also illustrated in FIG. 10-2, which provides a perspective view of barcode reader assembly 180.

The barcode reader 502 contained in barcode reader assembly 180 is a conventional barcode reader, such as a barcode reader supplied by Symbol Technologies, for example. Such barcode readers need to be slightly offset so that the beam (e.g., laser) reflection is not direct (since direct reflection would provide too much noise). The barcode reader 502 is supplied power and electrical signals by the ribbon cable 182, previously discussed.

FIG. 10-3 and FIG. 10-4 show structural details of barcode reader assembly 180. The barcode reader 502 is situated in a housing which comprises barcode assembly housing cover 506 and a barcode assembly housing bottom 508. The barcode assembly housing bottom 508 has a midportion thereof which is deformed to provide an inclined ramp 510. A bottom plate 512 is secured to barcode assembly housing bottom 508 to provide uniform flatness of the barcode assembly housing bottom 508 beneath bottom plate 510.

The bottom plate 512 in barcode assembly housing bottom 508 serves as a support for a reflector surface 520. The reflector surface 520 can be, for example, a mirrored or other suitably polished surface. The reflector surface 520 is positioned on bottom plate 512 so that, after beam 500 from barcode reader 502 strikes reflector surface 520, the beam is reflected and subsequently passes through a transparent lens 522.

As further shown by FIG. 10-3 and FIG. 10-4, the barcode reader 502 is supported by barcode reader platform 530. The barcode reader platform 530 includes both a front portion 532 and a rear portion 534. The barcode reader platform front portion 532 has, on opposite side edges thereof, opposing orthogonally oriented ears 536. The ears 536 have pivot pins 538 laternally extending therefrom. The pivot pins 538 are retained by corresponding mating mounting grooves 540 formed in barcode assembly housing bottom 508 (see FIG. 10-4). The pivot pins 538 thus serve as a pivoting axis for barcode reader platform front portion 532, and thus for barcode reader 502.

The barcode reader platform rear portion 534 has an aperture which is internally counter threaded to receive a threaded shaft of an adjustment screw 550. The shaft of the adjustment screw 550 also extends through an aperture formed in a well 552. The well 552 is formed in a rear central portion of barcode assembly housing bottom 508. A head of adjustment screw 550 retains a washer 554 beneath the aperture in well 552; a nut 556 is tightened on the shaft of adjustment screw 550 above the aperture in well 554.

Since the aperture in barcode reader platform rear portion 534 is counter threaded relative to adjustment screw 550, manipulation of adjustment screw 550 causes the barcode reader platform rear portion 534 to rise or fall, in accordance with the direction of screw manipulation. Thus, manipulation of adjustment screw 550 serves to adjust the angle of inclination of barcode reader platform 530. As the position of barcode reader platform rear portion 534 changes, the pivoting angle of barcode reader platform 530 about its pivot pins 538 is also changed, thereby affecting the angle of incidence of beam 500 on reflector surface 520.

Intermediate barcode reader platform front portion 532 and barcode reader platform rear portion 534 is a hinge section 560 of barcode reader platform 530. In the illustrated embodiment, the hinge section 560 is implemented by the section 560 having less thickness than either barcode reader platform front portion 532 or barcode reader platform rear portion 534. The hinge section 560 thus provides a flexure. The flexure afforded by living hinge section 560 provides a biasing force that takes play out of the system. The flexure of living hinge section 560 provides a tensioning for barcode reader platform 530, eliminating any influence occasioned by backlash from adjustment screw 550. Other ways of accomplishing backlash counteraction structures are also possible and are within the scope of the present invention. For example, a biasing spring can be provided to bias the barcode reader platform rear portion 534 to counteract backlash caused by movement of adjustment screw 550.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A robot assembly comprising:
   a robot which rotates about an axis from a first position to a second position, the robot having an electronic device carried thereon;
   a ribbon cable which supplies at least one of power and an electrical signal to the electronic device;
   a mounting block upon which the robot is mounted, the mounting block having a chamber wherein a portion of the ribbon cable is carried in a variable coiled configuration to accommodate rotation of the robot.

2. The apparatus of claim 1, wherein the mounting block is a carriage which linearly translates with the robot.

3. The apparatus of claim 1, wherein the variable coiled configuration facilitates the cabling having a first degree of coiling when the robot rotates to its first position and a second degree of coiling when the robot rotates to its second position.

4. The apparatus of claim 3, wherein the first degree of coiling is 4 coils of the ribbon cable and the second degree of coiling is 3.5 coils of the ribbon cable.

5. The apparatus of claim 1, wherein the chamber is concentric with the axis of rotation of the robot.

6. The apparatus of claim 1, wherein the chamber is cylindrical and concentric with the axis of rotation of the robot.

7. The apparatus of claim 1, wherein the chamber is cylindrical and has a circumferential aperture through which the ribbon cable enters the chamber.

8. The apparatus of claim 7, wherein the aperture is elongated in a direction parallel to the axis of rotation of the robot.

9. The apparatus of claim 7, wherein the mounting block has a bulbous protrusion proximate the aperture, and wherein a clip secures a portion of the ribbon cable to the mounting block at the bulbous protrusion.

10. The apparatus of claim 1, wherein the ribbon cable exits the chamber in a direction parallel to the axis of rotation of the robot.

11. The apparatus of claim 1, wherein the ribbon cable exits the chamber in a direction parallel to an axis about which the ribbon cable is coiled.

12. The apparatus of claim 1, wherein the mounting block includes a gear for translating rotation of a shaft extending through the mounting block into rotational motion of the robot.

13. A cartridge picker for a cartridge library, the picker comprising:
a picker robot having picker fingers for selecting engaging and disengaging a media cartridge, the picker robot having an electronic device carried thereon;
a ribbon cable which supplies at least one of power and an electrical signal to the electronic device;
a mounting block upon which the picker robot is rotatably mounted so that the picker robot rotates about an axis from a first position to a second position, the mounting block having a chamber wherein a portion of the ribbon cable is carried in a variable coiled configuration to accommodate rotation of the robot.

14. The apparatus of claim 13, wherein the mounting block is a carriage which linearly translates with the picker robot.

15. The apparatus of claim 13, wherein the variable coiled configuration facilitates the cabling having a first degree of coiling when the picker robot rotates to its first position and a second degree of coiling when the picker robot rotates to its second position.

16. The apparatus of claim 15, wherein the first degree of coiling is 4 coils of the ribbon cable and the second degree of coiling is 3.5 coils of the ribbon cable.

17. The apparatus of claim 13, wherein the chamber is concentric with the axis of rotation of the picker robot.

18. The apparatus of claim 13, wherein the chamber is cylindrical and concentric with the axis of rotation of the picker robot.

19. The apparatus of claim 13, wherein the chamber is cylindrical and has a circumferential aperture through which the ribbon cable enters the chamber.

20. The apparatus of claim 19, wherein the aperture is elongated in a direction parallel to the axis of rotation of the picker robot.

21. The apparatus of claim 20, wherein the mounting block has a bulbous protrusion proximate the aperture, and wherein a clip secures a portion of the ribbon cable to the mounting block at the bulbous protrusion.

22. The apparatus of claim 13, wherein the ribbon cable exits the chamber in a direction parallel to the axis of rotation of the picker robot.

23. The apparatus of claim 13, wherein the ribbon cable exits the chamber in a direction parallel to an axis about which the ribbon cable is coiled.

24. The apparatus of claim 13, wherein the mounting block includes a gear for translating rotation of a shaft extending through the mounting block into rotational motion of the picker robot.

25. An automated media library comprising:
a library frame;
a drive which performs at least one of recording and reproducing operations with respect to media in a media cartridge loaded into the drive;
a cartridge magazine situated in the library frame and which accommodates plural media cartridges;
a picker robot which transports a cartridge between the drive and the cartridge magazine, a picker robot having picker fingers for selecting engaging and disengaging a media cartridge, the picker robot having an electronic device carried thereon;
a ribbon cable which supplies at least one of power and an electrical signal to the electronic device;
a mounting block upon which the picker robot is rotatably mounted so that the picker robot rotates about an axis from a first position to a second position, the mounting block having a chamber wherein a portion of the ribbon cable is carried in a variable coiled configuration to accommodate rotation of the robot.

26. The apparatus of claim 25, wherein the mounting block is a carriage which linearly translates with the picker robot.

27. The apparatus of claim 25, wherein the variable coiled configuration facilitates the cabling having a first degree of coiling when the picker robot rotates to its first position and a second degree of coiling when the picker robot rotates to its second position.

28. The apparatus of claim 25, wherein the first degree of coiling is 4 coils of the ribbon cable and the second degree of coiling is 3.5 coils of the ribbon cable.

29. The apparatus of claim 25, wherein the chamber is concentric with the axis of rotation of the picker robot.

30. The apparatus of claim 25, wherein the chamber is cylindrical and concentric with the axis of rotation of the picker robot.

31. The apparatus of claim 25, wherein the chamber is cylindrical and has a circumferential aperture through which the ribbon cable enters the chamber.

32. The apparatus of claim 31, wherein the aperture is elongated in a direction parallel to the axis of rotation of the picker robot.

33. The apparatus of claim 32, wherein the mounting block has a bulbous protrusion proximate the aperture, and wherein a clip secures a portion of the ribbon cable to the mounting block at the bulbous protrusion.

34. The apparatus of claim 25, wherein the ribbon cable exits the chamber in a direction parallel to the axis of rotation of the picker robot.

35. The apparatus of claim 25, wherein the ribbon cable exits the chamber in a direction parallel to an axis about which the ribbon cable is coiled.

36. The apparatus of claim 25, wherein the mounting block includes a gear for translating rotation of a shaft extending through the mounting block into rotational motion of the picker robot.

* * * * *